（12） United States Patent
Hagiwara et al.

(10) Patent No.: US 10,302,002 B2
(45) Date of Patent: May 28, 2019

(54) DETERIORATION DIAGNOSIS APPARATUS FOR EXHAUST GAS PURIFICATION APPARATUS

(71) Applicant: TOYOTA JIDOSHA KABUSHIKI KAISHA, Toyota-shi, Aichi (JP)

(72) Inventors: Koji Hagiwara, Susono (JP); Toru Kidokoro, Hadano (JP); Yasushi Iwazaki, Edina (JP); Taisuke Yoshida, Susono (JP)

(73) Assignee: Toyota Jidosha Kabushiki Kaisha, Toyota-shi, Aichi (JP)

( * ) Notice: Subject to any disclaimer, the term of this patent is extended or adjusted under 35 U.S.C. 154(b) by 336 days.

(21) Appl. No.: 15/319,450

(22) PCT Filed: Jun. 15, 2015

(86) PCT No.: PCT/JP2015/002981
§ 371 (c)(1),
(2) Date: Dec. 16, 2016

(87) PCT Pub. No.: WO2015/194155
PCT Pub. Date: Dec. 23, 2015

(65) Prior Publication Data
US 2017/0138245 A1 May 18, 2017

(30) Foreign Application Priority Data

Jun. 20, 2014 (JP) .................. 2014-127654

(51) Int. Cl.
*A61L 9/00* (2006.01)
*B62D 25/10* (2006.01)
(Continued)

(52) U.S. Cl.
CPC ........ *F01N 11/007* (2013.01); *B01D 53/9418* (2013.01); *B01D 53/9422* (2013.01);
(Continued)

(58) Field of Classification Search
CPC .... F02D 41/025; F01N 13/009; F01N 3/0814; F01N 11/007; F01N 3/208;
(Continued)

(56) References Cited

U.S. PATENT DOCUMENTS 9,611,776 B2 4/2017 Hagiwara et al.
2010/0199636 A1 8/2010 Goya et al.
(Continued)

FOREIGN PATENT DOCUMENTS

EP 1 630 131 A1 3/2006
EP 2 175 969 4/2010
(Continued)

OTHER PUBLICATIONS

Office Action issued in U.S. Appl. No. 15/200,327 dated Dec. 29, 2017.
(Continued)

*Primary Examiner* — Monzer R Chorbaji
(74) *Attorney, Agent, or Firm* — Finnegan, Henderson, Farabow, Garrett & Dunner, LLP

(57) ABSTRACT

The present invention provides a deterioration diagnosis apparatus for an exhaust gas purification apparatus, including a first sensor that measures the oxygen concentration of the exhaust gas flowing into the exhaust gas purification apparatus, a second sensor that measures the oxygen concentration of the exhaust gas flowing out of the exhaust gas purification apparatus, and diagnosing means for diagnosing deterioration of the exhaust gas purification apparatus on the basis of a difference that appears between a measurement value of the first sensor and a measurement value of the second sensor when the air-fuel ratio of the exhaust gas flowing into the exhaust pas purification apparatus is switched from a lean air-fuel ratio to a rich air-fuel ratio, wherein, when the air-fuel ratio of the exhaust gas is (Continued)

switched from a lean air-fuel ratio to a rich air-fuel ratio, a water-gas shift reaction is generated upstream of the first sensor.

10 Claims, 12 Drawing Sheets

(51) Int. Cl.
| | |
|---|---|
| *G01N 33/497* | (2006.01) |
| *F02B 43/08* | (2006.01) |
| *B03C 3/68* | (2006.01) |
| *C01G 56/00* | (2006.01) |
| *F01N 11/00* | (2006.01) |
| *F01N 3/08* | (2006.01) |
| *F01N 3/20* | (2006.01) |
| *F01N 9/00* | (2006.01) |
| *F02D 41/02* | (2006.01) |
| *F02D 41/14* | (2006.01) |
| *F01N 13/00* | (2010.01) |
| *B01D 53/94* | (2006.01) |
| *F02D 41/40* | (2006.01) |

(52) U.S. Cl.
CPC ....... *B01D 53/9495* (2013.01); *F01N 3/0814* (2013.01); *F01N 3/0842* (2013.01); *F01N 3/0871* (2013.01); *F01N 3/0885* (2013.01); *F01N 3/2066* (2013.01); *F01N 3/2073* (2013.01); *F01N 9/00* (2013.01); *F01N 11/00* (2013.01); *F01N 11/002* (2013.01); *F01N 13/009* (2014.06); *F02D 41/0235* (2013.01); *F02D 41/0295* (2013.01); *F02D 41/1441* (2013.01); *F02D 41/1456* (2013.01); *F01N 2550/00* (2013.01); *F01N 2550/02* (2013.01); *F01N 2560/025* (2013.01); *F01N 2560/06* (2013.01); *F01N 2570/14* (2013.01); *F01N 2570/145* (2013.01); *F01N 2900/1402* (2013.01); *F02D 41/027* (2013.01); *F02D 41/0275* (2013.01); *F02D 41/405* (2013.01); *F02D 2200/0816* (2013.01); *Y02C 20/10* (2013.01); *Y02T 10/24* (2013.01); *Y02T 10/47* (2013.01)

(58) Field of Classification Search
CPC .......... G01N 27/4065; G01N 27/4073; B01D 53/9418; Y02T 10/24; Y02T 10/47
USPC .............. 180/69.4; 44/903; 73/23.31, 23.32, 73/23.33, 35.05, 35.06, 114.01; 423/12; 123/3; 422/305–306, 83, 88, 94–95, 98, 422/105, 119, 625; 96/25, 121, 136, 420
See application file for complete search history.

(56) References Cited

U.S. PATENT DOCUMENTS

| | | | |
|---|---|---|---|
| 2010/0254862 | A1 | 10/2010 | Sato et al. |
| 2012/0095658 | A1* | 4/2012 | Yasui ................. F02D 41/1403 701/60 |
| 2012/0291721 | A1 | 11/2012 | Pursifull et al. |
| 2013/0118461 | A1* | 5/2013 | Mitchell ................. F02D 21/08 123/681 |
| 2014/0144125 | A1* | 5/2014 | Cavataio ................. F01N 3/101 60/274 |
| 2017/0009626 | A1 | 1/2017 | Hagiwara et al. |
| 2017/0167352 | A1 | 6/2017 | Hagiwara et al. |

FOREIGN PATENT DOCUMENTS

| | | |
|---|---|---|
| JP | 2000-18022 | 1/2000 |
| JP | 2000-350934 | 12/2000 |
| JP | 2004-285840 | 10/2004 |
| JP | 2008-128213 A | 6/2008 |
| JP | 2009-106913 | 5/2009 |
| JP | 2010-65602 | 3/2010 |
| JP | 2010-236458 | 10/2010 |
| JP | 2012-241652 | 12/2012 |
| JP | 2016-008510 A | 1/2016 |
| WO | WO 2009/013610 A2 | 1/2009 |

OTHER PUBLICATIONS

Notice of Allowance issued in U.S. Appl. No. 15/200,327 dated Jun. 5, 2018.
Corrected Notice of Allowability issued in U.S. Appl. No. 15/200,327 dated Aug. 9, 2018.

* cited by examiner

[Fig. 1]
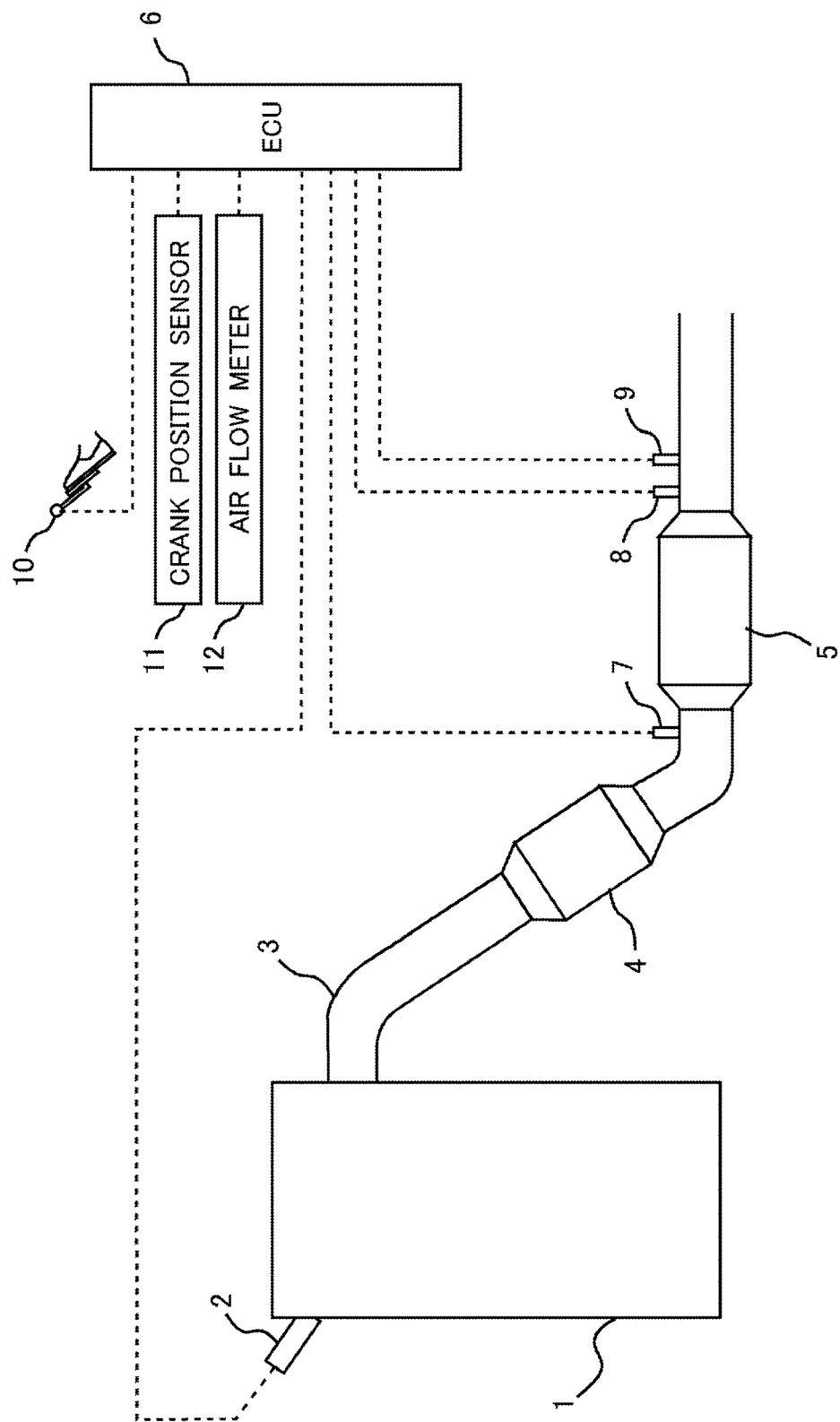

[Fig. 2]
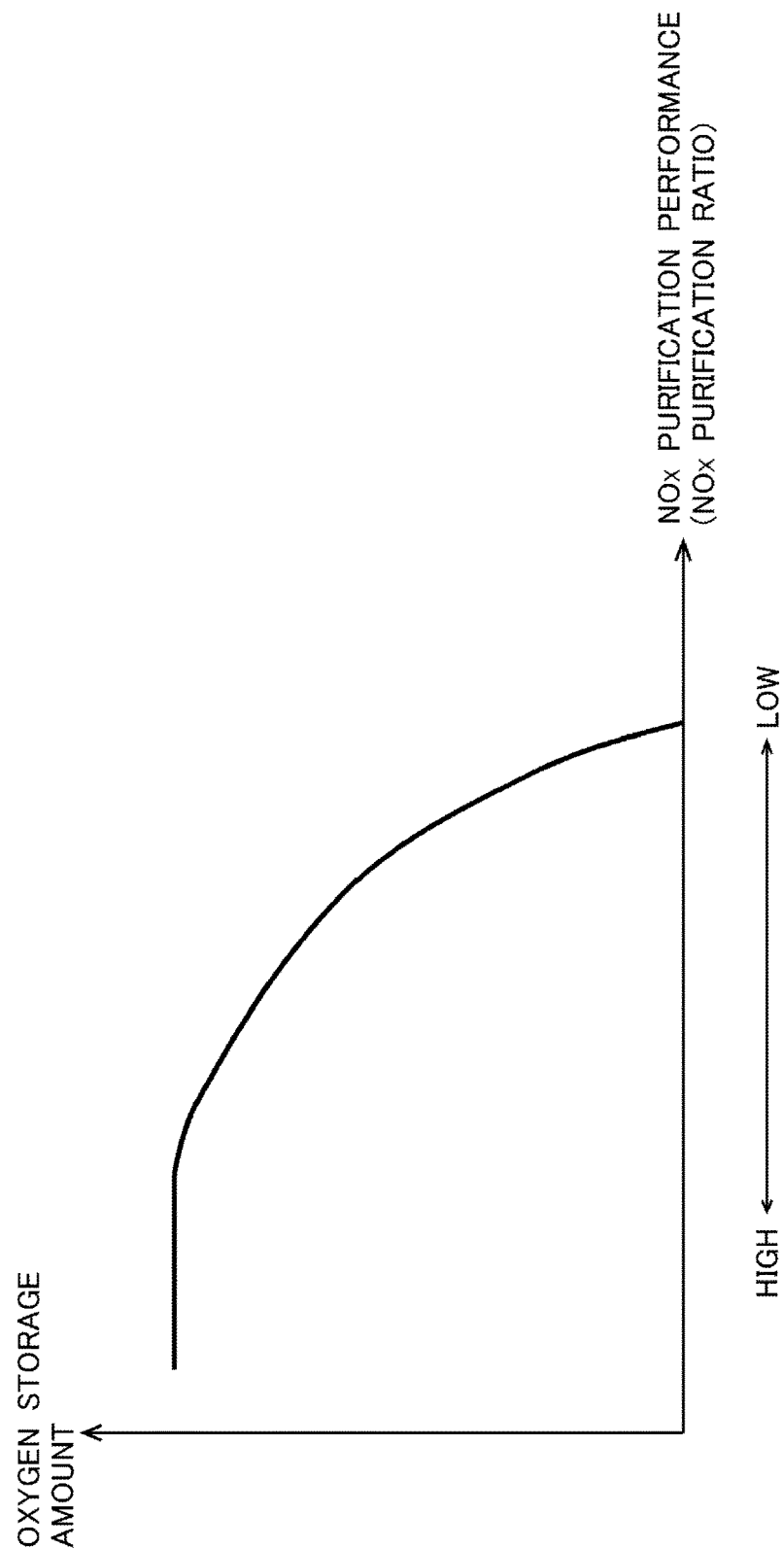

[Fig. 3]
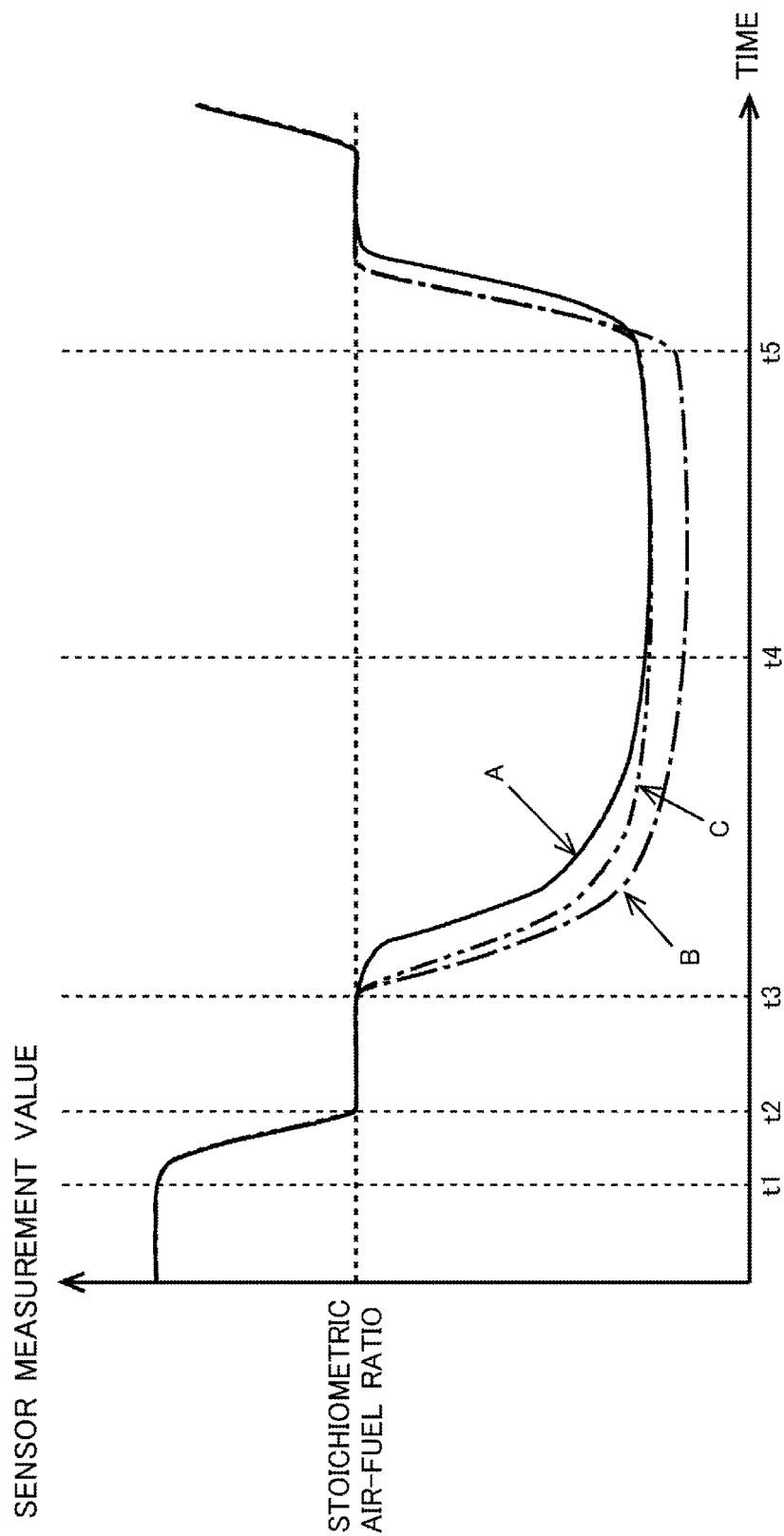

[Fig. 4]
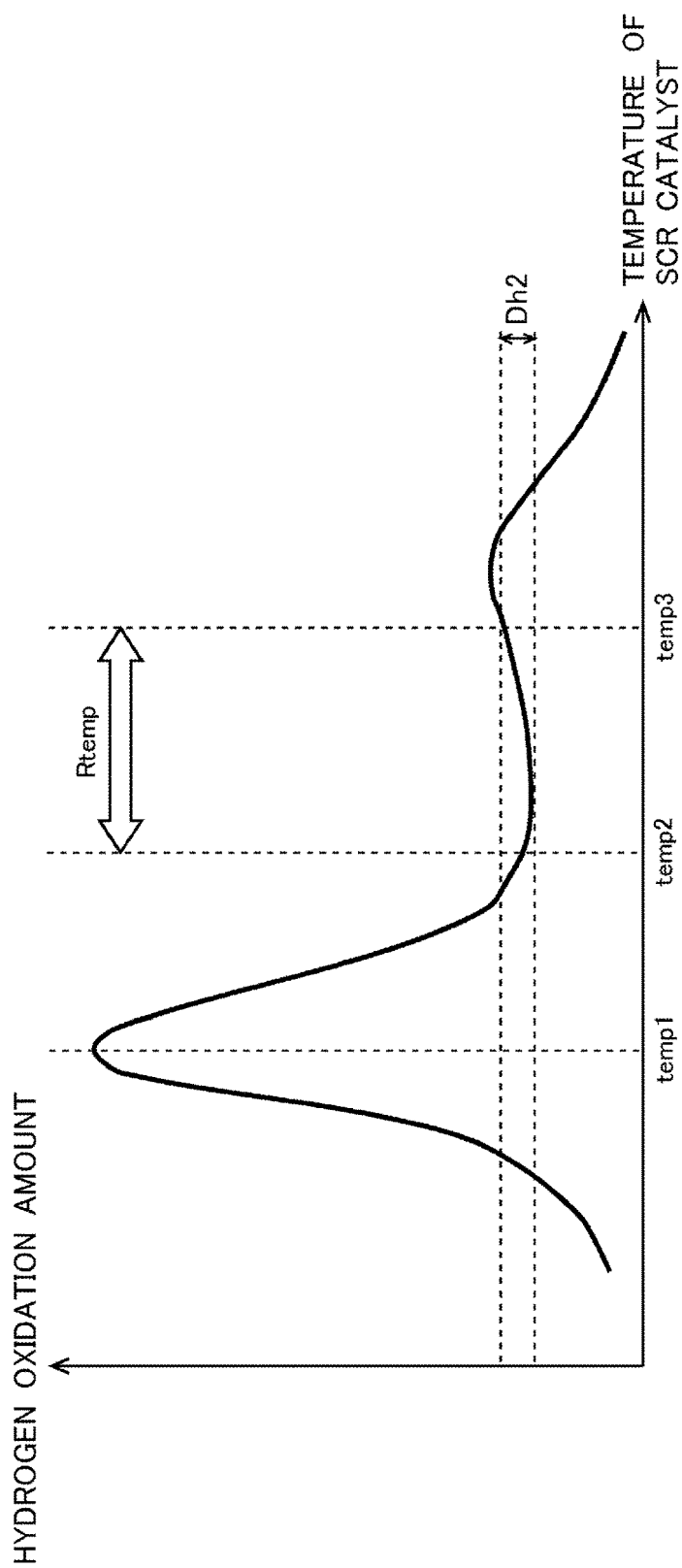

[Fig. 5]
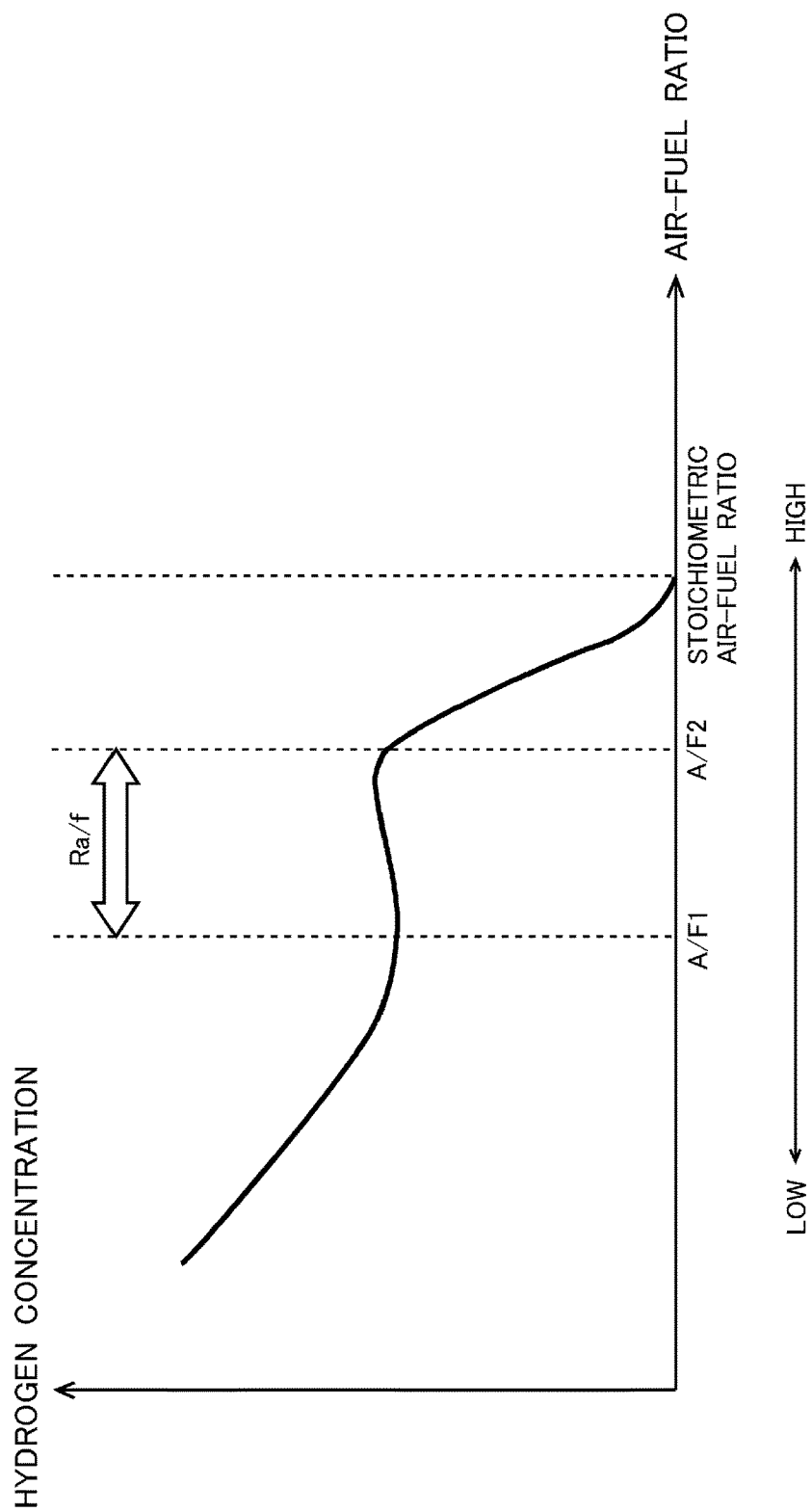

[Fig. 6]
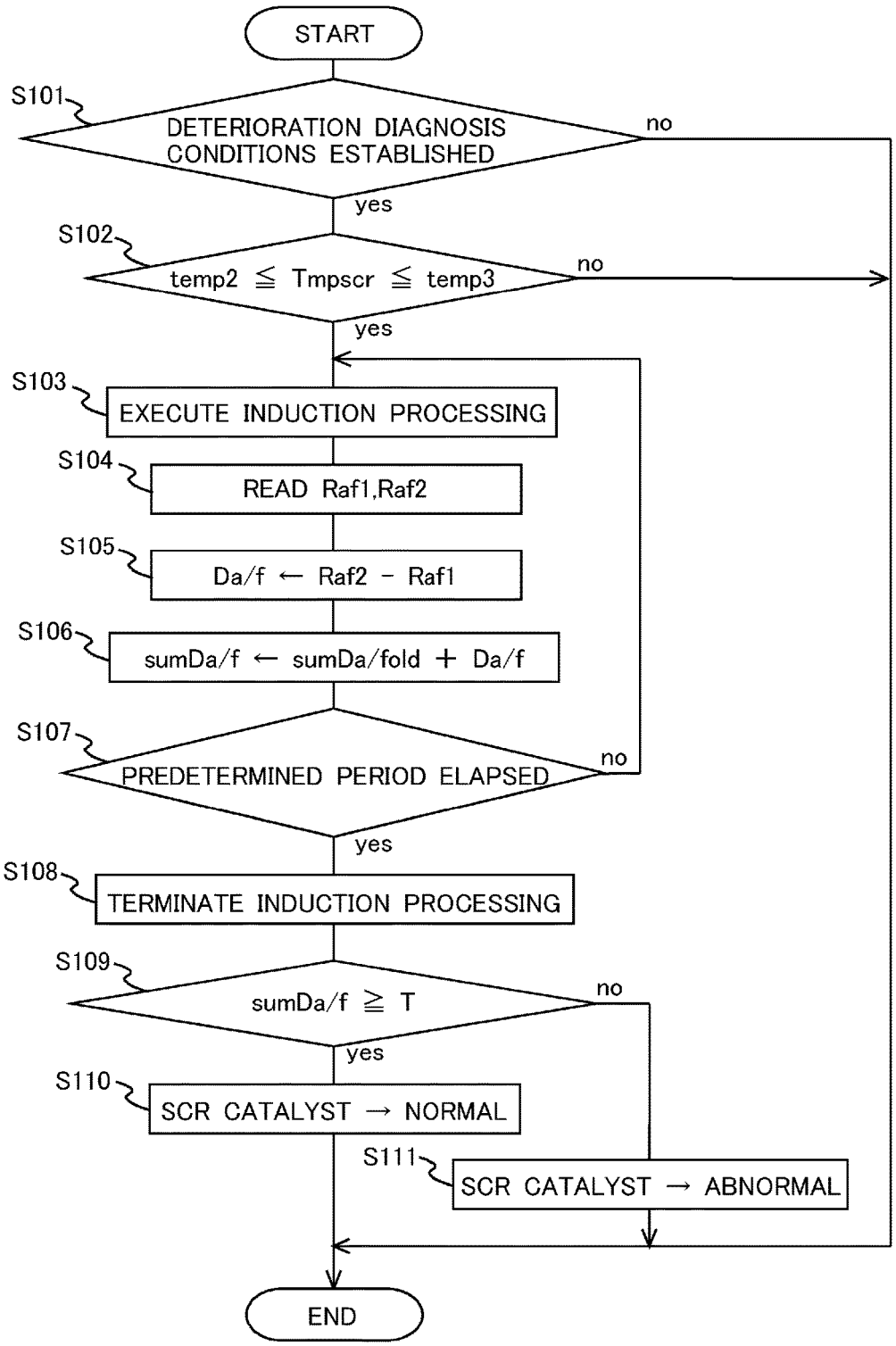

[Fig. 7]
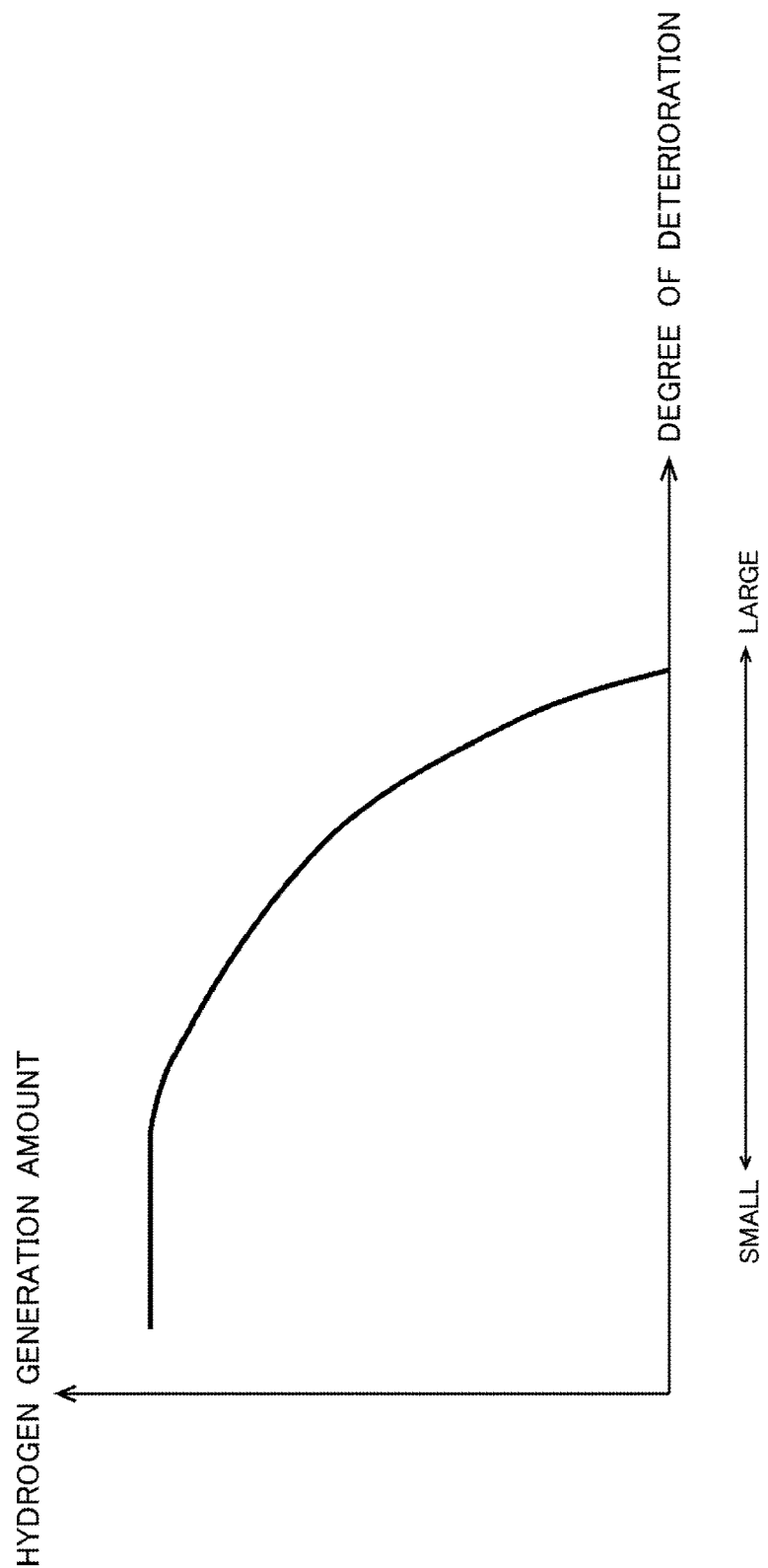

[Fig. 8]
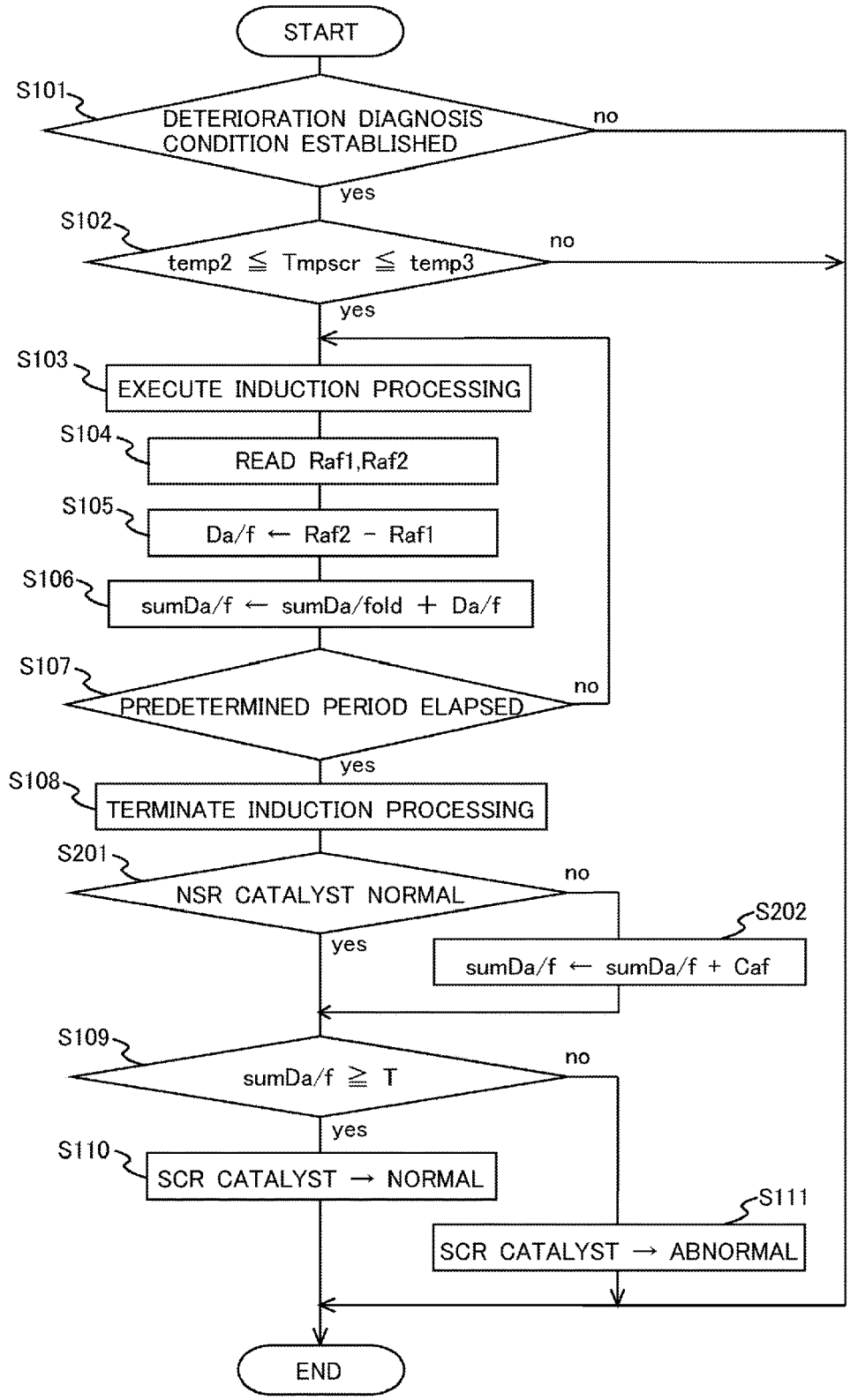

[Fig. 9]
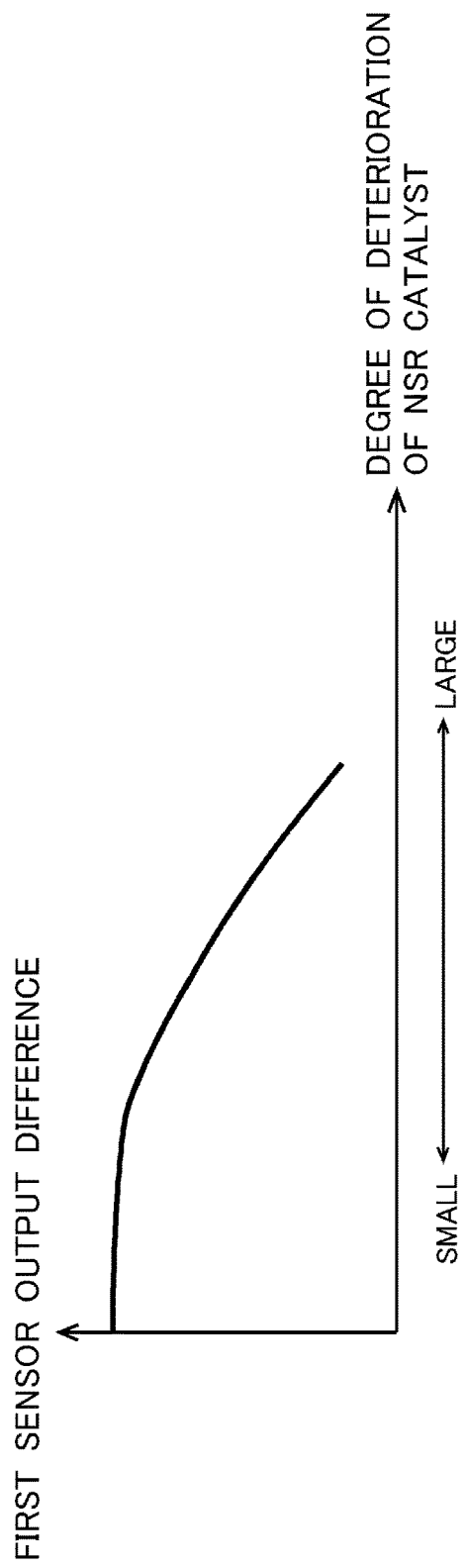

[Fig. 10]
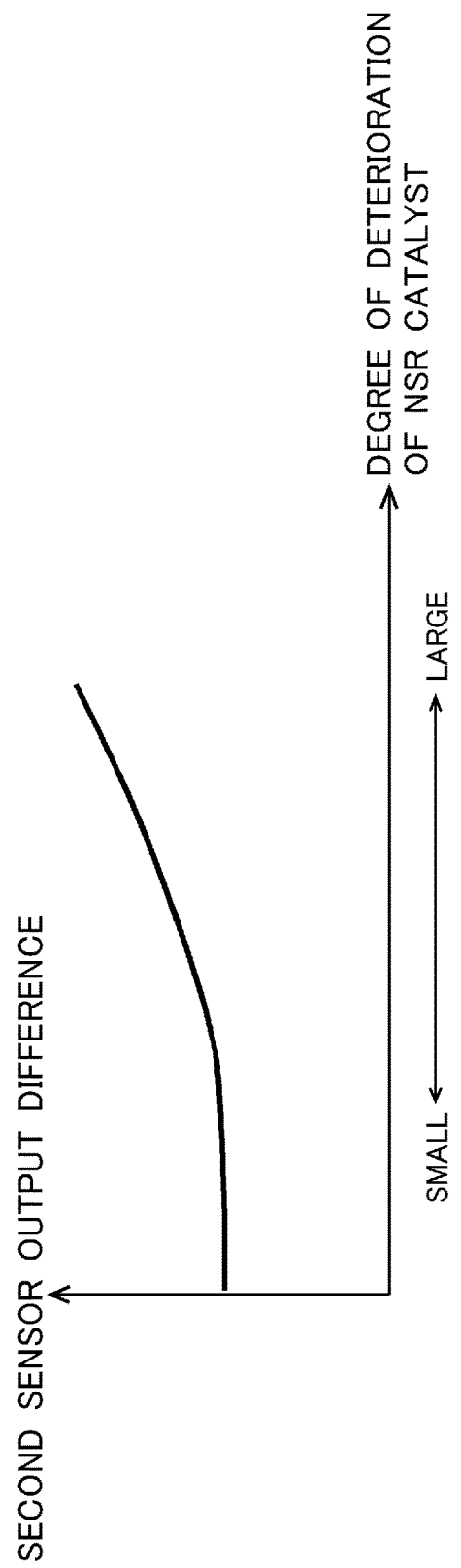

[Fig. 11]
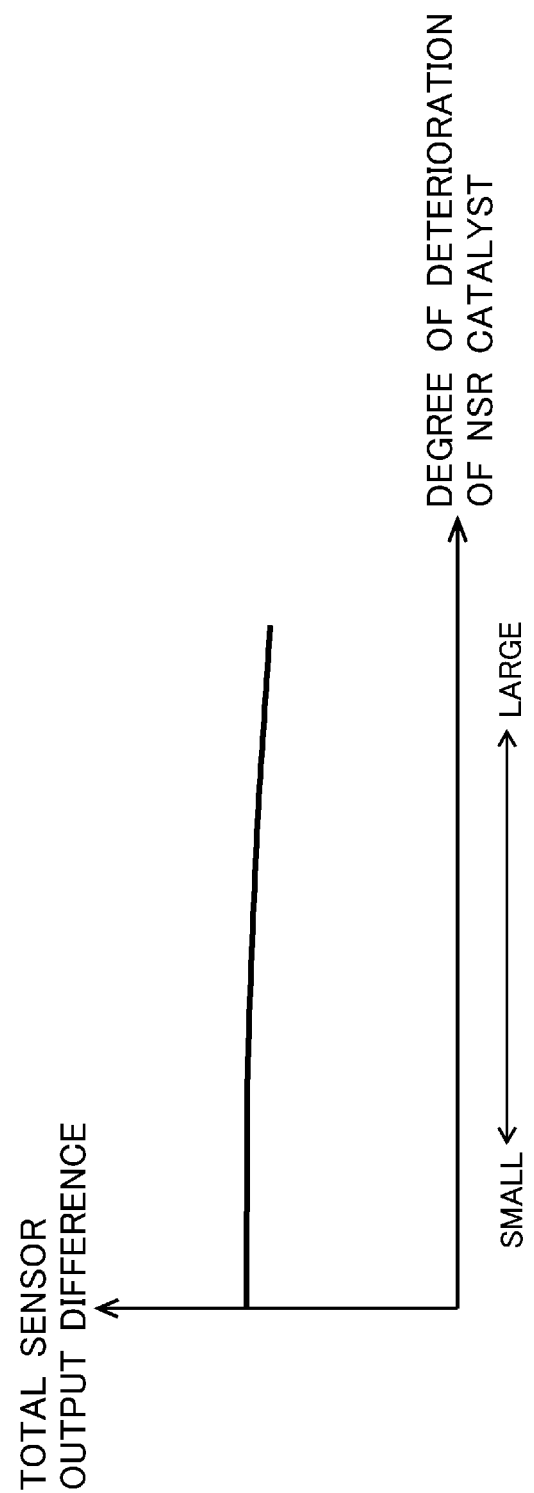

[Fig. 12]
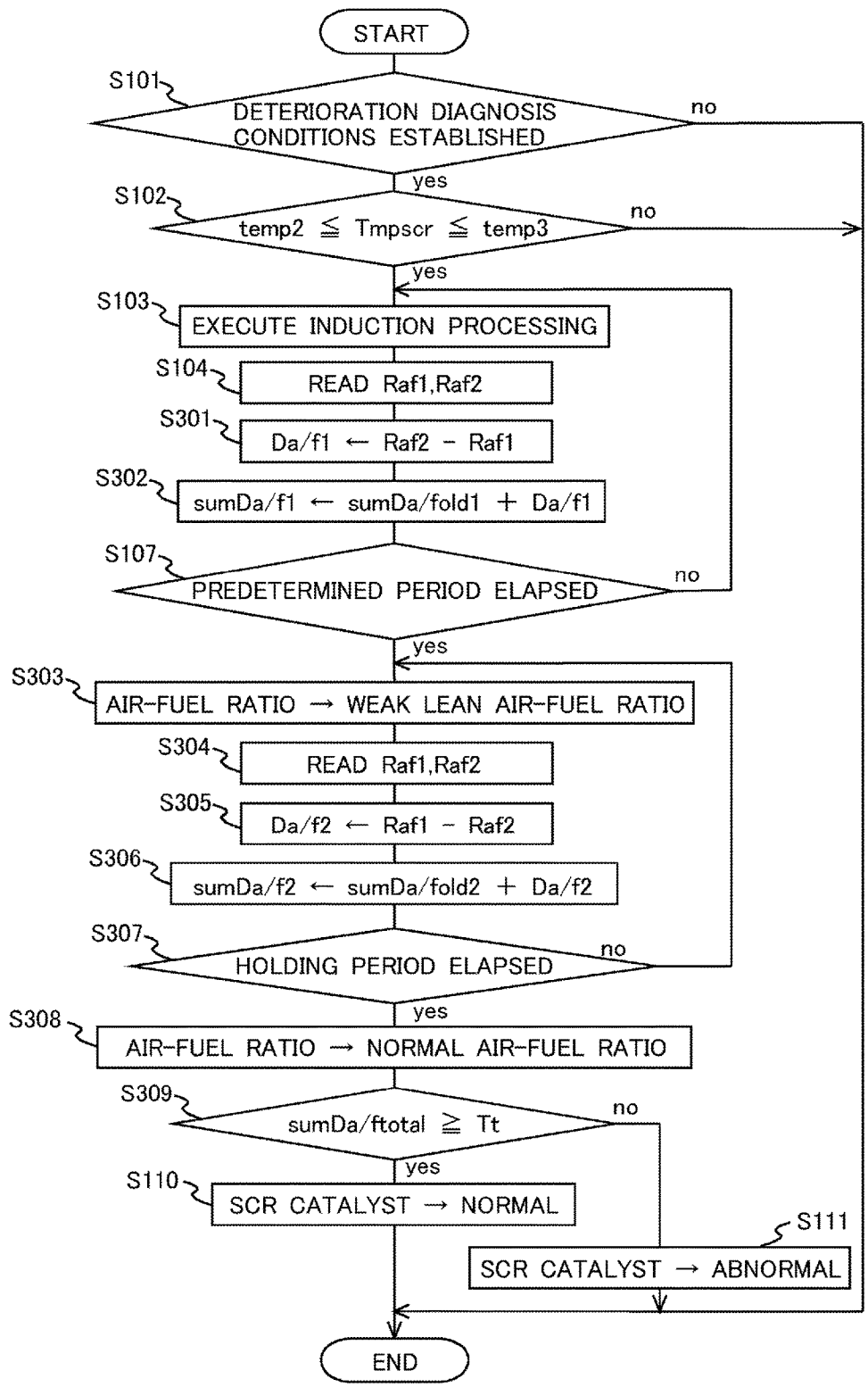

DETERIORATION DIAGNOSIS APPARATUS FOR EXHAUST GAS PURIFICATION APPARATUS

CROSS-REFERENCE TO RELATED APPLICATIONS

This application is a national phase application of International Application No. PCT/JP2015/002981, filed Jun. 15, 2015, and claims the priority of Japanese Application No. 2014-127654, filed Jun. 20, 2014, the content of both of which is incorporated herein by reference.

TECHNICAL FIELD

The present invention relates to a technique for diagnosing deterioration of an exhaust gas purification apparatus disposed in an exhaust passage of an internal combustion engine, and more particularly to a technique for diagnosing deterioration of an exhaust gas purification apparatus having a selective catalytic reduction catalyst (an SCR catalyst).

BACKGROUND ART

In a conventional technique employed as a method of diagnosing deterioration of an exhaust gas purification apparatus disposed in an exhaust passage of an internal combustion engine, an amount (an oxygen storage capacity) of oxygen that can be occluded to the exhaust gas purification apparatus is determined from a difference between an oxygen concentration of exhaust gas flowing into the exhaust gas purification apparatus and an oxygen concentration of exhaust gas flowing out of the exhaust gas purification apparatus after an air-fuel ratio of the exhaust gas flowing into the exhaust gas purification apparatus is modified from a lean air-fuel ratio that is higher than the stoichiometric air-fuel ratio to a rich air-fuel ratio that is lower than the stoichiometric air-fuel ratio, and deterioration of the exhaust gas purification apparatus is diagnosed on the basis of the oxygen storage capacity (see Patent Document 1, for example).

CITATION LIST

Patent Literature

Patent Literature 1: Japanese Patent Application Laid-Open No. 2012-241652
Patent Literature 2: Japanese Patent Application Laid-Open No. 2004-285840
Patent Literature 3: Japanese Patent Application Laid-Open No. 2009-106913
Patent Literature 4: Japanese Patent Application Laid-Open No. 2000-018022
Patent Literature 5: Japanese Patent Application Laid-Open No. 2010-236458
Patent Literature 6: Japanese Patent Application Laid-Open No. 2000-350934
Patent Literature 7: Japanese Patent Application Laid-Open No. 2010-065602

SUMMARY OF INVENTION

Technical Problem

Incidentally, the conventional technique described above is applied to an exhaust gas purification apparatus having a three-way catalyst. However, a selective catalytic reduction catalyst exhibits a similar oxygen storage performance to a three-way catalyst, and therefore deterioration of the selective catalytic reduction catalyst may be diagnosed using a similar method to that of the conventional technique described above. In this case, an advantage is gained in that deterioration of the selective catalytic reduction catalyst can be diagnosed without using an expensive sensor such as a $NO_X$ sensor, an $NH_3$ sensor, or the like.

However, the oxygen storage capacity of the selective catalytic reduction catalyst is comparatively small, and therefore, when a measurement value of a sensor (an air-fuel ratio sensor or an oxygen concentration sensor, for example) that detects the oxygen concentration of the exhaust gas flowing into the exhaust gas purification apparatus and the oxygen concentration of the exhaust gas flowing out of the exhaust gas purification apparatus includes an error, the oxygen storage capacity of the selective catalytic reduction catalyst cannot be determined accurately. As a result, a precision of the diagnosis may decrease.

The present invention has been designed in consideration of the circumstances described above, and an object thereof is to provide a technique with which deterioration of a selective catalytic reduction catalyst provided in an exhaust gas purification apparatus can be diagnosed with a high degree of precision using a sensor that detects an oxygen concentration of exhaust gas flowing into the exhaust gas purification apparatus and a sensor that detects an oxygen concentration of exhaust gas flowing out of the exhaust gas purification apparatus.

Solution to Problem

To solve the problem described above, the inventors of the present application focused on the fact that when a purification performance of a selective catalytic reduction catalyst deteriorates, an oxygen storage performance of the selective catalytic reduction catalyst and a hydrogen oxidation ability of the selective catalytic reduction catalyst also deteriorate. In other words, the inventors of the present application focused on the fact that an oxygen storage capacity of the selective catalytic reduction catalyst and an amount of hydrogen oxidized in the selective catalytic reduction catalyst are both smaller when the purification performance of the selective catalytic reduction catalyst has deteriorated than when the purification performance has not deteriorated.

Accordingly, a deterioration diagnosis apparatus for an exhaust gas purification apparatus according to the present invention was configured such that when deterioration of the exhaust gas purification apparatus, which includes a selective catalytic reduction catalyst, is diagnosed, a water-gas shift reaction is induced upstream of a sensor used to detect an oxygen concentration of exhaust gas flowing into the exhaust gas purification apparatus.

More specifically, a deterioration diagnosis apparatus for an exhaust gas purification apparatus according to the present invention includes:

a first exhaust gas purification apparatus that is provided in an exhaust passage of an internal combustion engine capable of performing a lean burn operation, and includes a catalyst that promotes a water-gas shift reaction when an air-fuel ratio of exhaust gas is a rich air-fuel ratio that is lower than a stoichiometric air-fuel ratio;

a second exhaust gas purification apparatus that is disposed in the exhaust passage downstream of the first exhaust gas purification apparatus, and includes a selective catalytic reduction catalyst that occludes oxygen contained in the exhaust gas when the air-fuel ratio of the exhaust gas is a lean air-fuel ratio that is higher than the stoichiometric air-fuel ratio, and releases the occluded oxygen when the air-fuel ratio of the exhaust gas is equal to or lower than the stoichiometric air-fuel ratio;

a first sensor disposed in the exhaust passage between the first exhaust gas purification apparatus and the second exhaust gas purification apparatus in order to measure a physical quantity that correlates with an oxygen concentration of exhaust gas flowing into the second exhaust gas purification apparatus;

a second sensor disposed in the exhaust passage downstream of the second exhaust gas purification apparatus in order to measure a physical quantity that correlates with an oxygen concentration of exhaust gas flowing out of the second exhaust gas purification apparatus;

control means for executing induction processing, which is processing for inducing the water-gas shift reaction in the first exhaust gas purification apparatus, by modifying an air-fuel ratio of exhaust gas flowing into the first exhaust gas purification apparatus to a rich air-fuel ratio that is lower than the stoichiometric air-fuel ratio when an air-fuel ratio of exhaust gas discharged from the internal combustion engine is a lean air-fuel ratio; and diagnosing means for diagnosing deterioration of the second exhaust gas purification apparatus using, as a parameter, a difference that appears between a measurement value of the first sensor and a measurement value of the second sensor when the induction processing is executed.

When the air-fuel ratio of the exhaust gas discharged from the internal combustion engine is a lean air-fuel ratio, the air-fuel ratio of the exhaust gas flowing respectively into the first exhaust gas purification apparatus and the second exhaust gas purification apparatus becomes a lean air-fuel ratio. In this case, the oxygen contained in the exhaust gas is occluded to the selective catalytic reduction catalyst provided in the second exhaust gas purification apparatus.

When the induction processing is executed while the air-fuel ratio of the exhaust gas discharged from the internal combustion engine is lean, the air-fuel ratio of the exhaust gas flowing respectively into the first exhaust gas purification apparatus and the second exhaust gas purification apparatus is switched from a lean air-fuel ratio to a rich air-fuel ratio. When the air-fuel ratio of the exhaust gas flowing into the second exhaust gas purification apparatus is switched from a lean air-fuel ratio to a rich air-fuel ratio, the oxygen occluded to the selective catalytic reduction catalyst is released into the exhaust gas.

When oxygen is released into the exhaust gas from the selective catalytic reduction catalyst, the oxygen concentration of the exhaust gas flowing out of the second exhaust gas purification apparatus becomes higher than the oxygen concentration of the exhaust gas flowing into the second exhaust gas purification apparatus. As a result, a difference caused by the oxygen released from the selective catalytic reduction catalyst in the second exhaust gas purification apparatus is generated between the measurement value of the first sensor and the measurement value of the second sensor.

Further, when the air-fuel ratio of the exhaust gas flowing into the first exhaust gas purification apparatus is enriched upon execution of the induction processing, a water-gas shift reaction occurs in the catalyst of the first exhaust gas purification apparatus. As a result, carbon monoxide (CO) and water ($H_2O$) in the exhaust gas react in the catalyst of the first exhaust gas purification apparatus such that carbon dioxide ($CO_2$) and hydrogen ($H_2$) are generated.

The hydrogen generated in the first exhaust gas purification apparatus reaches the first sensor together with the exhaust gas. At this time, a diffusion rate of the hydrogen is quicker than that of other exhaust gas components, and therefore the hydrogen reaches a sensor element of the first sensor first such that a rich atmosphere is formed thereon. As a result, the measurement value of the first sensor indicates a lower value than the actual oxygen concentration (i.e. a rich deviation occurs). When the hydrogen generated in the first exhaust gas purification apparatus subsequently flows into the second exhaust gas purification apparatus, the hydrogen is oxidized by the selective catalytic reduction catalyst in the second exhaust gas purification apparatus. Accordingly, a rich deviation occurring in the second sensor becomes smaller than the rich deviation of the first sensor. As a result, a difference caused by the hydrogen generated by the catalyst in the first exhaust gas purification apparatus is generated between the measurement value of the first sensor and the measurement value of the second sensor.

Hence, the difference that appears between the measurement value of the first sensor and the measurement value of the second sensor when the induction processing is executed includes both the difference caused by the oxygen released from the selective catalytic reduction catalyst in the second exhaust gas purification apparatus and the difference caused by the hydrogen generated in the first exhaust gas purification apparatus. Note that the "difference that appears between the measurement value of the first sensor and the measurement value of the second sensor when the induction processing is executed" denotes a sum (an integrated value) of the difference between the measurement value of the first sensor and the measurement value of the second sensor over a period extending from the start to the end of the induction processing, for example, and will be referred to hereafter as a "sensor output difference".

Here, an oxygen storage performance of the selective catalytic reduction catalyst in the second exhaust gas purification apparatus is poorer when the selective catalytic reduction catalyst has deteriorated than when the selective catalytic reduction catalyst has not deteriorated. Accordingly, an amount of oxygen released from the selective catalytic reduction catalyst in the second exhaust gas purification apparatus upon execution of the induction processing is smaller when the selective catalytic reduction catalyst has deteriorated than when the selective catalytic reduction catalyst has not deteriorated. As a result, the measurement value of the second sensor approaches the measurement value of the first sensor.

Further, an amount of hydrogen oxidized by the selective catalytic reduction catalyst in the second exhaust gas purification apparatus is smaller when the selective catalytic reduction catalyst has deteriorated than when the selective catalytic reduction catalyst has not deteriorated. Accordingly, an amount of hydrogen reaching the second sensor upon execution of the induction processing is larger when the selective catalytic reduction catalyst in the second exhaust gas purification apparatus has deteriorated than when the selective catalytic reduction catalyst has not deteriorated, leading to an increase in the rich deviation of the second sensor. As a result, the measurement value of the second sensor approaches the measurement value of the first sensor.

Hence, when the selective catalytic reduction catalyst in the second exhaust gas purification apparatus has not deteriorated, the sensor output difference increases due to a synergistic effect between the oxygen storage performance and a hydrogen oxidation performance of the selective catalytic reduction catalyst, but when the selective catalytic reduction catalyst in the second exhaust gas purification apparatus deteriorates, the sensor output difference decreases due to a synergistic effect between respective reductions in the oxygen storage performance and the hydrogen oxidation performance of the selective catalytic reduction catalyst. As a result, a dramatic difference is generated between the sensor output difference obtained in a case where the selective catalytic reduction catalyst in the second exhaust gas purification apparatus has not deteriorated and the sensor output difference obtained in a case where the selective catalytic reduction catalyst has deteriorated.

When a dramatic difference is generated between the sensor output difference obtained in a case where the selective catalytic reduction catalyst in the second exhaust gas purification apparatus has not deteriorated and the sensor output difference obtained in a case where the selective catalytic reduction catalyst has deteriorated, an effect of an error included in the measurement value of the first sensor or the second sensor decreases relative thereto, and as a result, deterioration of the second exhaust gas purification apparatus can be diagnosed with a high degree of precision. Moreover, existing sensors such as oxygen concentration sensors or air-fuel ratio sensors can be used as the first sensor and the second sensor, and therefore a cost of the exhaust gas purification apparatus can be reduced in comparison with a case where $NO_X$ sensors, $NH_3$ sensors, or the like are used.

Note that in the deterioration diagnosis apparatus for an exhaust gas purification apparatus according to the present invention, the control means preferably executes the induction processing when a temperature of the second exhaust gas purification apparatus falls within a temperature range in which the hydrogen contained in the exhaust gas can be oxidized by the selective catalytic reduction catalyst of the second exhaust gas purification apparatus.

Note, however, that when the induction processing is executed in a temperature range where an amount of variation in the hydrogen oxidation amount increases relative to an amount of variation in the temperature of the second exhaust gas purification apparatus, or in other words a temperature range in which the hydrogen oxidation amount is highly sensitive to variation in the temperature of the second exhaust gas purification apparatus, and the temperature of the second exhaust gas purification apparatus varies during the induction processing, the hydrogen oxidation amount varies greatly, and as a result, the precision of the diagnosis may decrease.

Hence, the control means according to the present invention may execute the induction processing when the temperature of the second exhaust gas purification apparatus falls within a temperature range in which the hydrogen contained in the exhaust gas is oxidized by the selective catalytic reduction catalyst of the second exhaust gas purification apparatus, an amount by which the hydrogen oxidation amount varies within the temperature range being equal to or smaller than a predetermined amount. Here, the "predetermined value" is a value at which a sufficient difference is generated between the sensor output differences obtained respectively when the selective catalytic reduction catalyst has deteriorated and when the selective catalytic reduction catalyst has not deteriorated as long as the amount of variation in the hydrogen oxidation amount caused by variation in the temperature of the second exhaust gas purification apparatus is equal to or lower than the predetermined value.

According to this method, the amount of hydrogen oxidized by the selective catalytic reduction catalyst in the second exhaust gas purification apparatus no longer varies greatly when the temperature of the second exhaust gas purification apparatus varies during the induction processing. As a result, the precision of the deterioration diagnosis can be improved reliably.

Here, a three-way catalyst carrying a precious metal such as platinum (Pt), a $NO_X$ storage reduction catalyst (an NSR catalyst) in which a $NO_X$ occlusion material such as an alkali metal is attached to a three-way catalyst, or the like can be used as the catalyst provided in the first exhaust gas purification apparatus.

Note that when the first exhaust gas purification apparatus includes a $NO_X$ storage reduction catalyst, rich spike processing must be implemented appropriately to maintain a $NO_X$ storage ability of the $NO_X$ storage reduction catalyst. In the rich spike processing, the air-fuel ratio of the exhaust gas is set at a rich air-fuel ratio that is lower than the stoichiometric air-fuel ratio, and therefore a water-gas shift reaction may be generated likewise during the rich spike processing. Hence, deterioration of the second exhaust gas purification apparatus can also be executed during the rich spike processing.

From the viewpoint of suppressing an amount of consumed fuel, however, the air-fuel ratio of the exhaust gas is preferably kept as high as possible during the rich spike processing. During the rich spike processing, therefore, the air-fuel ratio of the exhaust gas is highly likely to be set at a weak rich air-fuel ratio in the vicinity of the stoichiometric air-fuel ratio. When the air-fuel ratio of the exhaust gas is set at a weak rich air-fuel ratio, the amount of hydrogen generated per unit time by the $NO_X$ storage reduction catalyst in the first exhaust gas purification apparatus decreases, and as a result, the sensor output difference caused by the hydrogen generated by the $NO_X$ storage reduction catalyst in the first exhaust gas purification apparatus may decrease.

Hence, in a case where the first exhaust gas purification apparatus according to the present invention includes a $NO_X$ storage reduction catalyst, the control means may make the air-fuel ratio of the exhaust gas flowing into the first exhaust gas purification apparatus during execution of the induction processing lower than the air-fuel ratio of the exhaust gas flowing into the first exhaust gas purification apparatus during execution of the rich spike processing. According to this method, the amount of hydrogen generated per unit time by the $NO_X$ storage reduction catalyst in the first exhaust gas purification apparatus can be increased when the induction processing is executed, and therefore deterioration of the second exhaust gas purification apparatus can be diagnosed after increasing the sensor output difference caused by the hydrogen generated by the $NO_X$ storage reduction catalyst in the first exhaust gas purification apparatus. As a result, the precision with which deterioration of the second exhaust gas purification apparatus is diagnosed can be increased reliably.

Incidentally, a water-gas shift reaction is less likely to be activated when the catalyst in the first exhaust gas purification apparatus has deteriorated than when the catalyst has not deteriorated, and as a result, the amount of hydrogen generated by the catalyst in the first exhaust gas purification apparatus during the induction processing decreases. When the catalyst in the first exhaust gas purification apparatus deteriorates, therefore, the sensor output difference may decrease even though the selective catalytic reduction catalyst in the second exhaust gas purification apparatus has not deteriorated. As a result, deterioration of the second exhaust gas purification apparatus may be misdiagnosed when the second exhaust gas purification apparatus has not deteriorated.

In response to this problem, the deterioration diagnosis apparatus for an exhaust gas purification apparatus according to the present invention may further include correcting means for correcting the difference (the sensor output difference) appearing between the measurement value of the first sensor and the measurement value of the second sensor upon execution of the induction processing when the catalyst in the first exhaust gas purification apparatus has deteriorated, and for correcting the sensor output difference so as to increase steadily as a degree of deterioration of the catalyst in the first exhaust gas purification apparatus increases.

The amount of hydrogen generated by the catalyst in the first exhaust gas purification apparatus during the induction processing decreases steadily as the degree of deterioration of the catalyst in the first exhaust gas purification apparatus increases. Accordingly, the sensor output difference decreases steadily as the degree of deterioration of the catalyst in the first exhaust gas purification apparatus increases. However, by correcting the sensor output difference to increase steadily as the degree of deterioration of the catalyst in the first exhaust gas purification apparatus increases and diagnosing deterioration of the second exhaust gas purification apparatus using the corrected sensor output difference, a reduction in the precision of the diagnosis due to deterioration of the catalyst in the first exhaust gas purification apparatus (i.e. a reduction in the hydrogen generation amount) is suppressed.

Note that the correcting means may correct a threshold that is compared with the sensor output difference instead of correcting the sensor output difference. For example, in a method where the second exhaust gas purification apparatus is determined to be normal when the sensor output difference equals or exceeds the threshold and is diagnosed as having deteriorated when the sensor output difference is smaller than the threshold, for example, the correcting means may correct the threshold to be steadily smaller as the degree of deterioration of the catalyst in the first exhaust gas purification apparatus increases. Likewise in this case, a reduction in the precision of the diagnosis due to deterioration of the catalyst in the first exhaust gas purification apparatus can be suppressed.

Here, a reduction in the hydrogen generation amount due to deterioration of the catalyst provided in the first exhaust gas purification apparatus may occur not only when the catalyst in the first exhaust gas purification apparatus is a $NO_X$ storage reduction catalyst, but also when the catalyst in the first exhaust gas purification apparatus is a three-way catalyst or an oxidation catalyst. Hence, the correction performed by the correcting means on the sensor output difference or the threshold is also effective when the catalyst in the first exhaust gas purification apparatus is a three-way catalyst or an oxidation catalyst.

Further, when the catalyst in the first exhaust gas purification apparatus is a $NO_X$ storage reduction catalyst, the diagnosing means may diagnose deterioration of the exhaust gas purification apparatus using, as a parameter, a sum of a difference between the measurement value of the first sensor and the measurement value of the second sensor obtained when the air-fuel ratio of the exhaust gas flowing into the first exhaust gas purification apparatus is modified from a lean air-fuel ratio to a rich air-fuel ratio in response to execution of the induction processing, and a difference between the measurement value of the first sensor and the measurement value of the second sensor obtained when the air-fuel ratio of the exhaust gas flowing into the first exhaust gas purification apparatus is modified from a rich air-fuel ratio to a lean air-fuel ratio upon termination of the induction processing.

As described above, when the air-fuel ratio of the exhaust gas is modified from a lean air-fuel ratio to a rich air-fuel ratio in response to execution of the induction processing, a difference (referred to hereafter as a "first sensor output difference") appears between the measurement value of the first sensor and the measurement value of the second sensor due to an action of the hydrogen generated in the first exhaust gas purification apparatus and the oxygen released from the selective catalytic reduction catalyst in the second exhaust gas purification apparatus. The first sensor output difference decreases steadily as the degree of deterioration of the $NO_X$ storage reduction catalyst provided in the first exhaust gas purification apparatus increases.

When the air-fuel ratio of the exhaust gas is modified from a rich air-fuel ratio to a lean air-fuel ratio upon termination of the induction processing, on the other hand, the oxygen in the exhaust gas is occluded to the selective catalytic reduction catalyst in the second exhaust gas purification apparatus, and as a result, a difference (referred to hereafter as a "second sensor output difference") appears between the measurement value of the first sensor and the measurement value of the second sensor. Note that when the air-fuel ratio of the exhaust gas is modified from a rich air-fuel ratio to a lean air-fuel ratio, an amount of oxygen that can be occluded to the selective catalytic reduction catalyst decreases steadily as an amount of ammonia ($NH_3$) adsorbed to the selective catalytic reduction catalyst at that time increases.

Here, the ammonia adsorbed to the selective catalytic reduction catalyst is generated when a part of $NO_X$ that is desorbed from the $NO_X$ storage reduction catalyst in the first exhaust gas purification apparatus after the air-fuel ratio of the exhaust gas is modified from a lean air-fuel ratio to a rich air-fuel ratio in response to execution of the induction processing reacts with hydrocarbon (HC) and hydrogen ($H_2$) contained in the exhaust gas. Note, however, that the amount of ammonia generated by the first exhaust gas purification apparatus decreases steadily as the degree of deterioration of the $NO_X$ storage reduction catalyst increases. Accordingly, an amount of ammonia adsorbed to the selective catalytic reduction catalyst at a termination point of the induction processing decreases steadily as the degree of deterioration of the $NO_X$ storage reduction catalyst increases. As a result, the second sensor output difference increases steadily as the degree of deterioration of the $NO_X$ storage reduction catalyst provided in the first exhaust gas purification apparatus increases.

Hence, by adding the second sensor output difference to the first sensor output difference in a case where the $NO_X$ storage reduction catalyst in the first exhaust gas purification apparatus has deteriorated, a reduction in the first sensor output difference due to a reduction in the hydrogen generation amount is compensated for by an increase in the second sensor output difference due to a reduction in the ammonia generation amount. Therefore, by diagnosing deterioration of the second exhaust gas purification apparatus using the sum of the first sensor output difference and the second sensor output difference, the diagnosis can be performed with a high degree of precision even without taking the degree of deterioration of the $NO_X$ storage reduction catalyst provided in the first exhaust gas purification apparatus into account.

Note that the diagnosing means according to the present invention may diagnose deterioration of the second exhaust gas purification apparatus using the first sensor output difference as a parameter when the $NO_X$ storage reduction catalyst in the first exhaust gas purification apparatus has not deteriorated, and diagnose deterioration of the second exhaust gas purification apparatus using the sum of the first sensor output difference and the second sensor output difference as a parameter when the $NO_X$ storage reduction catalyst in the first exhaust gas purification apparatus has deteriorated. According to this method, a time required for the deterioration diagnosis can be shortened in a case where the $NO_X$ storage reduction catalyst in the first exhaust gas purification apparatus has not deteriorated.

Advantageous Effects of Invention

According to the present invention, deterioration of a selective catalytic reduction catalyst provided in an exhaust gas purification apparatus can be diagnosed with a high degree of precision using a sensor that detects an oxygen concentration of exhaust gas flowing into the exhaust gas purification apparatus and a sensor that detects an oxygen concentration of exhaust gas flowing out of the exhaust gas purification apparatus.

BRIEF DESCRIPTION OF DRAWINGS

FIG. 1 is a schematic view showing a configuration of an exhaust system of an internal combustion engine to which the present invention is applied.

FIG. 2 is a view showing a correlation between a $NO_X$ purification performance and an oxygen storage amount of an SCR catalyst.

FIG. 3 is a view showing temporal variation in a measurement value of a first air-fuel ratio sensor and a measurement value of a second air-fuel ratio sensor when induction processing is executed.

FIG. 4 is a view showing a temperature of the SCR catalyst and an amount of hydrogen oxidized per unit time by the SCR catalyst.

FIG. 5 is a view showing a correlation between an air-fuel ratio of exhaust gas flowing into a first catalyst casing and a hydrogen concentration of exhaust gas flowing out of the first catalyst casing.

FIG. 6 is a flowchart showing a processing routine executed by an ECU when diagnosing deterioration of the SCR catalyst according to a first embodiment.

FIG. 7 is a view showing a correlation between a degree of deterioration of a $NO_X$ storage reduction catalyst and an amount of hydrogen generated by the $NO_X$ storage reduction catalyst.

FIG. 8 is a flowchart showing a processing routine executed by the ECU when diagnosing deterioration of the SCR catalyst according to a second embodiment.

FIG. 9 is a view showing a correlation between the degree of deterioration of the $NO_X$ storage reduction catalyst (an NSR catalyst) and a first sensor output difference.

FIG. 10 is a view showing a correlation between the degree of deterioration of the $NO_X$ storage reduction catalyst (the NSR catalyst) and a second sensor output difference.

FIG. 11 is a view showing a correlation between the degree of deterioration of the $NO_X$ storage reduction catalyst (the NSR catalyst) and a total sensor output difference.

FIG. 12 is a flowchart showing a processing routine executed by the ECU when diagnosing deterioration of the SCR catalyst according to a third embodiment.

DESCRIPTION OF EMBODIMENTS

Specific embodiments of the present invention will be described below on the basis of the drawings. Unless specified otherwise, the technical scope of the invention is not limited only to dimensions, materials, shapes, relative arrangements, and so on of constituent components described in the embodiments.

Embodiment 1

First, a first embodiment of the present invention will be described on the basis of FIGS. 1 to 6. FIG. 1 is a schematic view showing a configuration of an exhaust system of an internal combustion engine to which the present invention is applied. An internal combustion engine 1 shown in FIG. 1 is a spark ignition type internal combustion engine (a gasoline engine) that can be operated by burning an air-fuel mixture having a lean air-fuel ratio that is higher than a stoichiometric air-fuel ratio (i.e. by performing a lean burn operation). However, the internal combustion engine 1 may be a compression ignition type internal combustion engine.

The internal combustion engine 1 includes a fuel injection valve 2 for supplying fuel to a cylinder. The fuel injection valve 2 may inject fuel into an intake port of each cylinder, or may inject fuel into the respective cylinders.

An exhaust pipe 3 is connected to the internal combustion engine 1. The exhaust pipe 3 includes a passage through which gas (exhaust gas) burned in the cylinders of the internal combustion engine 1 flows. A first catalyst casing 4 is disposed midway in the exhaust pipe 3. The first catalyst casing 4 houses a $NO_X$ storage reduction catalyst (referred to hereafter as an "NSR catalyst"). More specifically, the first catalyst casing 4 houses a honeycomb structure covered by a coating layer formed from alumina or the like, a precious metal (platinum (Pt), palladium (Pd), or the like) carried on the coating layer, an auxiliary catalyst formed from ceria ($CeO_2$) or the like and carried on the coating layer, and a $NO_X$ storage material (an alkali, an alkali earth, or the like) carried on the coating layer. The first catalyst casing 4 corresponds to a "first exhaust gas purification apparatus" according to the present invention.

A second catalyst casing 5 is disposed in the exhaust pipe 3 downstream of the first catalyst casing 4. The second catalyst casing 5 houses a selective catalytic reduction catalyst (referred to hereafter as an "SCR catalyst"). More specifically, the second catalyst casing 5 houses a honeycomb structure constituted by cordierite or Fe—Cr—Al based heat-resisting steel, a zeolite-based coating layer that covers the honeycomb structure, and a transition metal (copper (Cu), iron (Fe), or the like) carried on the coating layer. The second catalyst casing 5 corresponds to a "second exhaust gas purification apparatus" according to the present invention.

An ECU (Electronic Control Unit) 6 is annexed to the internal combustion engine 1 having the above configuration. The ECU 6 is an electronic control unit constituted by a CPU, a ROM, a RAM, a backup RAM, and so on. The ECU 6 is electrically connected to various sensors such as a first air-fuel ratio sensor 7, a second air-fuel ratio sensor 8, an exhaust gas temperature sensor 9, an accelerator position sensor 10, a crank position sensor 11, and an air flow meter 12.

The first air-fuel ratio sensor 7 is attached to the exhaust pipe 3 between the first catalyst casing 4 and the second catalyst casing 5, and outputs an electric signal that correlates with an air-fuel ratio of the exhaust gas flowing through the exhaust pipe 3. The first air-fuel ratio sensor 7 corresponds to a "first sensor" according to the present invention. Note that the first sensor according to the present invention may be any sensor capable of measuring a concentration of oxygen ($O_2$) in the exhaust gas, and therefore an oxygen concentration sensor (an $O_2$ sensor) may be attached in place of the first air-fuel ratio sensor 7.

The second air-fuel ratio sensor 8 is attached to the exhaust pipe 3 downstream of the second catalyst casing 5, and outputs an electric signal that correlates with the air-fuel ratio of the exhaust gas flowing through the exhaust pipe 3. The second air-fuel ratio sensor 8 corresponds to a "second sensor" according to the present invention. Note that the second sensor according to the present invention, similarly to the first sensor described above, may be any sensor capable of measuring the oxygen concentration of the exhaust gas, and therefore an oxygen concentration sensor may be attached in place of the second air-fuel ratio sensor 8.

The exhaust gas temperature sensor 9 is attached to the exhaust pipe 3 downstream of the second catalyst casing 5, and outputs an electric signal that correlates with a temperature of the exhaust gas flowing through the exhaust pipe 3. The accelerator position sensor 10 is attached to an accelerator pedal, and outputs an electric signal that correlates with an operation amount (an accelerator opening) of the accelerator pedal. The crank position sensor 11 is attached to the internal combustion engine 1, and outputs an electric signal that correlates with a rotation position of an engine output shaft (a crankshaft). The air flow meter 12 is attached to an intake pipe (not shown) of the internal combustion engine 1, and outputs an electric signal that correlates with an amount (a mass) of fresh air (air) flowing through the intake pipe.

The ECU 6 controls an operating condition of the internal combustion engine 1 on the basis of the output signals from the various sensors described above. For example, the ECU 6 calculates a target air-fuel ratio of the air-fuel mixture on the basis of an engine load calculated on the basis of the output signal (the accelerator opening) from the accelerator position sensor 10 and an engine rotation speed calculated on the basis of the output signal from the crank position sensor 11. The ECU 6 then calculates a target fuel injection amount (fuel injection period) on the basis of the target air-fuel ratio and the output signal (the intake air amount) from the air flow meter 12, and operates the fuel injection valve 2 in accordance with the target fuel injection amount. When, at this time, the operating condition of the internal combustion engine 1 is in a low rotation/low load region or a medium rotation/medium load region, the ECU 6 sets the target air-fuel ratio at a lean air-fuel ratio that is higher than the stoichiometric air-fuel ratio. Further, when the operating condition of the internal combustion engine 1 is in a high load region or a high rotation region, the ECU 6 sets the target air-fuel ratio at the stoichiometric air-fuel ratio or a rich air-fuel ratio that is lower than the stoichiometric air-fuel ratio. By causing the internal combustion engine 1 to perform a lean burn operation when the operating condition of the internal combustion engine 1 is in the low rotation/low load region or the medium rotation/medium load region (these operation regions will be referred to hereafter as a "lean operation region") in this manner, an amount of consumed fuel can be suppressed.

Further, when the operating condition of the internal combustion engine 1 is in the lean operation region, the ECU 6 executes rich spike processing as appropriate. The rich spike processing is processing for adjusting the fuel injection amount and the intake air amount such that the oxygen concentration of the exhaust gas decreases and concentrations of hydrocarbon and carbon monoxide increase. When the oxygen concentration of the exhaust gas flowing into the first catalyst casing 4 is high (i.e. when the air-fuel ratio of the exhaust gas is lean), the NSR catalyst housed in the first catalyst casing 4 occludes or adsorbs $NO_X$ contained in the exhaust gas, and when the oxygen concentration of the exhaust gas flowing into the first catalyst casing 4 is low and the exhaust gas contains reduced components such as hydrocarbon (HC) and carbon monoxide (CO) (i.e. when the air-fuel ratio of the exhaust gas is rich), the NSR catalyst housed in the first catalyst casing 4 releases the $NO_X$ occluded thereto and reduces the released $NO_X$ to nitrogen ($N_2$) and ammonia ($NH_3$). Hence, when the rich spike processing is executed, a $NO_X$ storage performance of the NSR catalyst is regenerated.

The ECU 6 therefore suppresses saturation of the $NO_X$ storage performance of the NSR catalyst by executing the rich spike processing when an amount of $NO_X$ occluded to the NSR catalyst reaches or exceeds a fixed amount, when an operation time following completion of preceding rich spike processing (preferably an operation time in which the target air-fuel ratio is set at a lean air-fuel ratio) reaches or exceeds a fixed time, or when a travel distance following completion of the preceding rich spike processing (preferably a travel distance over which the target air-fuel ratio is set at a lean air-fuel ratio) reaches or exceeds a fixed distance. A method in which at least one of processing for increasing the fuel injection amount of the fuel injection valve 2 and processing for reducing an opening of an intake throttle valve (a throttle valve) is executed may be used as a specific method of executing the rich spike processing. Note that in a configuration where the fuel injection valve 2 injects fuel directly into the cylinder, the rich spike processing may be executed using a method of injecting fuel from the fuel injection valve 2 during an exhaust stroke of the cylinder.

Next, the SCR catalyst in the second catalyst casing 5 adsorbs the ammonia ($NH_3$) contained in the exhaust gas, and reduces the $NO_X$ contained in the exhaust gas using the adsorbed ammonia as a reducing agent. The ammonia supplied to the SCR catalyst in the second catalyst casing 5 is generated in the NSR catalyst. For example, when the rich spike processing is executed, a part of the $NO_X$ released from the NSR catalyst in the first catalyst casing 4 reacts with the hydrocarbon (HC) and hydrogen ($H_2$) contained in the exhaust gas so as to be reduced to ammonia. The amount of ammonia generated in the NSR catalyst at this time varies according to an execution interval of the rich spike processing, the air-fuel ratio of the exhaust gas during the rich spike processing, and so on. Hence, when it is necessary to supply the SCR catalyst with ammonia, the ECU 6 may either set the execution interval of the rich spike processing at a suitable interval for generating the ammonia or set the air-fuel ratio of the exhaust gas during the rich spike processing at a suitable air-fuel ratio (approximately 14.1, for example) for generating the ammonia.

By executing the rich spike processing in accordance with various aims such as those described above, the $NO_X$ contained in the exhaust gas can be purified even when the internal combustion engine 1 performs a lean burn operation. Incidentally, when a $NO_X$ purification performance of the SCR catalyst housed in the second catalyst casing 5 deteriorates, $NO_X$ that was not purified in the first catalyst casing 4 may not be purified in the second catalyst casing 5 either, and as a result, the $NO_X$ may be discharged into the atmosphere. Therefore, when the $NO_X$ purification performance of the SCR catalyst deteriorates, the deterioration of the SCR catalyst must be detected quickly, whereupon a driver of the vehicle must be prompted to perform repairs and lean burn operations in the internal combustion engine 1 must be prohibited.

A method of diagnosing deterioration of the SCR catalyst housed in the second catalyst casing 5 will be described below. In a conventional method of diagnosing deterioration of an SCR catalyst, a $NO_X$ purification ratio (a ratio of an amount of $NO_X$ reduced in the SCR catalyst relative to an amount of $NO_X$ flowing into the SCR catalyst) is determined from the amount of $NO_X$ flowing into the SCR catalyst and an amount of $NO_X$ flowing out of the SCR catalyst, and a determination is made as to whether or not the $NO_X$ purification ratio is smaller than normal. To determine the $NO_X$ purification ratio, however, it is necessary at least to measure the amount of $NO_X$ flowing out of the SCR catalyst, and for this purpose, an expensive sensor such as a $NO_X$ sensor must be attached to the exhaust pipe 3.

A method of diagnosing deterioration of the SCR catalyst on the basis of the oxygen storage performance of the SCR catalyst may be considered instead. When the air-fuel ratio of the exhaust gas is lean, the SCR catalyst occludes the oxygen contained in the exhaust gas due to an action of the transition metal such as copper (Cu) or iron (Fe) contained in the SCR catalyst. The oxygen occluded to the SCR catalyst is desorbed from the SCR catalyst when the air-fuel ratio of the exhaust gas is switched from a lean air-fuel ratio to a rich air-fuel ratio.

The oxygen storage performance of the SCR catalyst correlates with the $NO_X$ purification performance of the SCR catalyst. FIG. 2 is a view showing a relationship between the $NO_X$ purification performance and an oxygen storage amount of the SCR catalyst. As shown in FIG. 2, when the $NO_X$ purification performance (the $NO_X$ purification ratio) of the SCR catalyst is sufficiently high (when the $NO_X$ purification ratio is between 80% and 100%, for example), the oxygen storage performance of the SCR catalyst is also sufficiently high, and when the $NO_X$ purification performance of the SCR catalyst decreases to a certain extent (when the $NO_X$ purification ratio falls below 80%, for example), the oxygen storage performance decreases accordingly. Hence, by specifying the oxygen storage performance of the SCR catalyst, a determination can be made as to whether or not the $NO_X$ purification performance of the SCR catalyst has deteriorated.

When the oxygen storage performance of the SCR catalyst decreases, the amount of oxygen that can be occluded to the SCR catalyst (an oxygen storage capacity) decreases. Therefore, when the oxygen storage capacity of the SCR catalyst falls below a predetermined threshold, it can be determined that the $NO_X$ purification performance of the SCR catalyst has deteriorated.

The oxygen storage capacity of the SCR catalyst correlates with an amount of oxygen that is desorbed from the SCR catalyst when the air-fuel ratio of the exhaust gas is switched from a lean air-fuel ratio to a rich air-fuel ratio. The amount of oxygen that is desorbed from the SCR catalyst when the air-fuel ratio of the exhaust gas is switched from a lean air-fuel ratio to a rich air-fuel ratio can be determined on the basis of a difference between the air-fuel ratio (or the oxygen concentration) of the exhaust gas flowing into the SCR catalyst and the air-fuel ratio (or the oxygen concentration) of the exhaust gas flowing out of the SCR catalyst.

For example, in a condition where the air-fuel ratio of the exhaust gas has been switched from a lean air-fuel ratio to a rich air-fuel ratio, a difference between a measurement value of the first air-fuel ratio sensor 7 and a measurement value of the second air-fuel ratio sensor 8 is determined, and by inserting the difference into Equation (1), shown below, an amount Aox of oxygen desorbed from the SCR catalyst at that time can be determined.

$$Aox = Da/f * a * Qinj \quad (1)$$

In Equation (1), Da/f is a value obtained by subtracting the measurement value of the first air-fuel ratio sensor 7 from the measurement value of the second air-fuel ratio sensor 8, a is a mass ratio of oxygen contained in air, and Qinj is the fuel injection amount.

Next, by executing calculation processing using Equation (1) repeatedly during a period in which the air-fuel ratio of the exhaust gas is maintained at a rich air-fuel ratio and integrating obtained calculation results, the amount of oxygen desorbed from the SCR catalyst when the air-fuel ratio of the exhaust gas is switched from a lean air-fuel ratio to a rich air-fuel ratio (i.e. the oxygen storage capacity) can be determined.

When deterioration of the SCR catalyst is diagnosed on the basis of the oxygen storage capacity determined using the method described above, deterioration of the SCR catalyst can be diagnosed using the existing oxygen concentration sensors or air-fuel ratio sensors, without the need for a $NO_X$ sensor.

Incidentally, the amount of oxygen that can be occluded to a normal SCR catalyst is smaller than that of a three-way catalyst, an NSR catalyst, or the like including an oxygen storage material such as ceria ($CeO_2$). Therefore, when an error is included in the measurement values of the first air-fuel ratio sensor 7 and the second air-fuel ratio sensor 8, a calculated value of the oxygen storage capacity may fall below a threshold even though the SCR catalyst is normal. Alternatively, the calculated value of the oxygen storage capacity may equal or exceed the threshold even though the SCR catalyst has deteriorated.

Hence, in this embodiment, when the oxygen storage capacity of the SCR catalyst is determined, processing (induction processing) is executed to induce a water-gas shift reaction in the NSR catalyst of the first catalyst casing 4. Here, the induction processing is processing for enriching the air-fuel ratio of the exhaust gas flowing into the first catalyst casing 4 when the operating condition of the internal combustion engine 1 is in the lean operation region.

When the induction processing is executed such that the air-fuel ratio of the exhaust gas flowing into the first catalyst casing 4 is modified from a lean air-fuel ratio to a rich air-fuel ratio, a water-gas shift reaction is promoted by the NSR catalyst in the first catalyst casing 4. In other words, a reaction between water ($H_2O$) and carbon monoxide (CO) in the exhaust gas is promoted by the NSR catalyst in the first catalyst casing 4, whereby hydrogen ($H_2$) and carbon dioxide ($CO_2$) are generated.

The hydrogen generated by the water-gas shift reaction reaches the first air-fuel ratio sensor 7 together with the exhaust gas. At this time, a diffusion rate of the hydrogen is quicker than that of other exhaust gas components, and therefore a majority of a sensor element surface of the first air-fuel ratio sensor 7 is covered by the hydrogen such that a rich atmosphere is formed thereon. As a result, a rich deviation, in which the measurement value of the first air-fuel ratio sensor 7 becomes lower than the actual air-fuel ratio of the exhaust gas, occurs.

Meanwhile, when the hydrogen generated in the first catalyst casing 4 flows into the second catalyst casing 5, hydroxide ions (OH) bonded to the transition metal (copper (Cu) or iron (Fe)) of the SCR catalyst react with the hydrogen in the exhaust gas such that water is generated. In other words, the hydrogen generated in the first catalyst casing 4 is oxidized and consumed by the second catalyst casing 5. As a result, a rich deviation occurring in the second air-fuel ratio sensor 8 becomes smaller than the rich deviation of the first air-fuel ratio sensor 7.

Hence, when the induction processing described above is implemented, a difference caused by the hydrogen generated by the NSR catalyst in the first catalyst casing 4 occurs between the measurement value of the first air-fuel ratio sensor 7 and the measurement value of the second air-fuel ratio sensor 8 in addition to the difference caused by the oxygen desorbed from the SCR catalyst in the second catalyst casing 5.

Here, FIG. 3 shows temporal variation in the measurement value of the first air-fuel ratio sensor 7 and the measurement value of the second air-fuel ratio sensor 8 when the induction processing is executed. A solid line A in FIG. 3 shows the measurement value of the second air-fuel ratio sensor 8 (the air-fuel ratio of the exhaust gas that flows out of the second catalyst casing 5) when the SCR catalyst in the second catalyst casing 5 is normal. A dot-dash line B in FIG. 3 shows the measurement value of the first air-fuel ratio sensor 7 (the air-fuel ratio of the exhaust gas that flows into the second catalyst casing 5) when a water-gas shift reaction occurs in the first catalyst casing 4 (when hydrogen is generated in the first catalyst casing 4). A dot-dot-dash line C in FIG. 3 shows the measurement value of the first air-fuel ratio sensor 7 (the air-fuel ratio of the exhaust gas that flows into the second catalyst casing 5) when a water-gas shift reaction does not occur in the first catalyst casing 4 (when hydrogen is not generated in the first catalyst casing 4).

In FIG. 3, when the induction processing is started (t1 in FIG. 3), the respective measurement values of the first air-fuel ratio sensor 7 and the second air-fuel ratio sensor 8 start to decrease. When the air-fuel ratio of the exhaust gas flowing into the first catalyst casing 4 falls to or below the stoichiometric air-fuel ratio, the respective measurement values of the first air-fuel ratio sensor 7 and the second air-fuel ratio sensor 8 are held in the vicinity of the stoichiometric air-fuel ratio in accordance with the oxygen storage performance of the NSR catalyst in the first catalyst casing 4 (t2 to t3 in FIG. 3). When all of the oxygen occluded to the NSR catalyst in the first catalyst casing 4 is released, the respective measurement values of the first air-fuel ratio sensor 7 and the second air-fuel ratio sensor 8 start to decrease toward a rich air-fuel ratio that is lower than the stoichiometric air-fuel ratio (t3 in FIG. 3). At this time, oxygen is released from the SCR catalyst in the second catalyst casing 5, and therefore the measurement value of the second air-fuel ratio sensor 8 becomes larger than the measurement value of the first air-fuel ratio sensor 7.

Here, when a water-gas shift reaction does not occur in the first catalyst casing 4, no rich deviation occurs in either the first air-fuel ratio sensor 7 or the second air-fuel ratio sensor 8, and therefore, at the point where all of the oxygen occluded to the SCR catalyst in the second catalyst casing 5 has been released, the measurement value of the second air-fuel ratio sensor 8 (the solid line A in FIG. 3) and the measurement value of the first air-fuel ratio sensor 7 (the dot-dot-dash line C in FIG. 3) are substantially identical (t4 in FIG. 3).

When a water-gas shift reaction occurs in the first catalyst casing 4, on the other hand, a rich deviation occurs in the first air-fuel ratio sensor 7. However, the hydrogen in the exhaust gas is oxidized by the SCR catalyst in the second catalyst casing 5, and therefore substantially no rich deviation occurs in the second air-fuel ratio sensor 8. Hence, a sufficient difference is generated between the measurement value of the second air-fuel ratio sensor 8 (the solid line A in FIG. 3) and the measurement value of the first air-fuel ratio sensor 7 (the dot-dash line B in FIG. 3) even after the oxygen occluded to the SCR catalyst in the second catalyst casing 5 is released. This difference is generated continuously until the induction processing is terminated (t5 in FIG. 3).

Therefore, when a water-gas shift reaction is induced in the first catalyst casing 4, a difference caused by the oxygen desorbed from the SCR catalyst in the second catalyst casing 5 and a difference caused by the hydrogen generated by the NSR catalyst in the first catalyst casing 4 are generated between the measurement value of the first air-fuel ratio sensor 7 and the measurement value of the second air-fuel ratio sensor 8. As a result, the difference (a sensor output difference) between the measurement value of the second air-fuel ratio sensor 8 (the solid line A in FIG. 3) and the measurement value of the first air-fuel ratio sensor 7 (the dot-dash line B in FIG. 3) over an execution period (t1 to t5 in FIG. 3) of the induction processing is larger when a water-gas shift reaction is induced in the first catalyst casing 4 than when a water-gas shift reaction is not induced.

When the SCR catalyst in the second catalyst casing 5 deteriorates, however, the oxygen storage performance and the hydrogen oxidation performance of the SCR catalyst both decrease. Therefore, the oxygen storage capacity of the SCR catalyst and the amount of hydrogen oxidized by the SCR catalyst are both smaller when the SCR catalyst in the second catalyst casing 5 has deteriorated than when the SCR catalyst has not deteriorated. A reduction in the oxygen storage capacity of the SCR catalyst leads to a reduction in the amount of oxygen released from the SCR catalyst during the induction processing. As a result, the measurement value of the second air-fuel ratio sensor 8 approaches the measurement value of the first air-fuel ratio sensor 7. Further, when the amount of hydrogen oxidized by the SCR catalyst decreases, an amount of hydrogen reaching the second air-fuel ratio sensor 8 during the induction processing increases, leading to an increase in the rich deviation of the second air-fuel ratio sensor 8. As a result, the measurement value of the second air-fuel ratio sensor 8 approaches the measurement value of the first air-fuel ratio sensor 7.

Hence, when the SCR catalyst in the second catalyst casing 5 has not deteriorated, the sensor output difference increases due to a synergistic effect between the oxygen storage performance and the hydrogen oxidation performance of the SCR catalyst, but when the SCR catalyst in the second catalyst casing 5 deteriorates, the sensor output difference decreases due to a synergistic effect between the respective reductions in the oxygen storage performance and the hydrogen oxidation performance of the SCR catalyst. As a result, a dramatic difference occurs between the sensor output difference obtained in a case where the SCR catalyst in the second catalyst casing 5 has not deteriorated and the sensor output difference obtained in a case where the SCR catalyst in the second catalyst casing 5 has deteriorated.

When a dramatic difference occurs between the sensor output difference obtained in a case where the SCR catalyst in the second catalyst casing 5 has not deteriorated and the sensor output difference obtained in a case where the SCR catalyst has deteriorated, the effect of an error included in the measurement value of the first air-fuel ratio sensor 7 and/or the measurement value of the second air-fuel ratio sensor 8 can be reduced, and as a result, deterioration of the SCR catalyst in the second catalyst casing 5 can be diagnosed with a high degree of precision. Moreover, deterioration of the SCR catalyst can be diagnosed using the existing air-fuel ratio sensors (or oxygen concentration sensors), and therefore a cost of the deterioration diagnosis apparatus can be reduced in comparison with a case where a $NO_X$ sensor, an $NH_3$ sensor, or the like is used.

Incidentally, the amount of hydrogen oxidized by the SCR catalyst in the second catalyst casing 5 may vary according to a temperature of the SCR catalyst. FIG. 4 is a view showing a relationship between the temperature of the SCR catalyst and an amount of hydrogen oxidized by the SCR catalyst per unit time (a hydrogen oxidation amount). Note that FIG. 4 shows the relationship when the SCR catalyst has not deteriorated.

In FIG. 4, the hydrogen oxidation amount reaches a maximum when the temperature of the SCR catalyst is at tempt (between 150° C. and 300° C., for example) in FIG. 4, but varies greatly when the temperature of the SCR catalyst deviates from tempt. Hence, when the induction processing is implemented while the temperature of the SCR catalyst is on either side of tempt, the measurement value of the second air-fuel ratio sensor 8 may vary greatly in response to variation in the temperature of the SCR catalyst. Therefore, the induction processing is preferably executed within a temperature range where an amount of variation in the hydrogen oxidation amount is small in relation to an amount of variation in the temperature of the SCR catalyst.

Hence, in this embodiment, the induction processing is executed within a temperature range (a temperature range Rtemp between temp2 and temp3 in FIG. 4) where a difference Dh2 between a maximum value and a minimum value of the hydrogen oxidation amount within the temperature range is equal to or smaller than a predetermined value. In this case, the hydrogen oxidation amount of the SCR catalyst no longer varies greatly even when the temperature of the SCR catalyst varies to a certain extent during the induction processing. Accordingly, large variation in the measurement value of the second air-fuel ratio sensor 8 in response to variation in the temperature of the SCR catalyst is suppressed, and as a result, a reduction in the precision of the diagnosis can be suppressed. Note that the temperature range Rtemp is a range of 300° C. to 450° C., for example. Further, the predetermined value is a value that is sufficiently smaller than a difference between the hydrogen oxidation amount obtained when the SCR catalyst has not deteriorated and the hydrogen oxidation amount obtained when the SCR catalyst has deteriorated.

Furthermore, the amount of hydrogen generated by the NSR catalyst in the first catalyst casing 4 may vary in accordance with the air-fuel ratio of the exhaust gas flowing into the first catalyst casing 4. FIG. 5 is a view showing a relationship between the air-fuel ratio of the exhaust gas flowing into the first catalyst casing 4 and a concentration of the hydrogen contained in the exhaust gas that flows out of the first catalyst casing 4. Note that FIG. 5 shows the relationship when the NSR catalyst in the first catalyst casing 4 has not deteriorated.

In FIG. 5, when the air-fuel ratio of the exhaust gas flowing into the first catalyst casing 4 is lower than the stoichiometric air-fuel ratio, the hydrogen concentration of the exhaust gas flowing out of the first catalyst casing 4 increases. It is therefore assumed that when the deterioration diagnosis is performed after executing the rich spike processing in order to reduce the $NO_X$ occluded to the NSR catalyst in the first catalyst casing 4, a clear difference will appear between a case in which the SCR catalyst has deteriorated and a case in which the SCR catalyst has not deteriorated. During the rich spike processing, however, the air-fuel ratio of the exhaust gas is often limited to a rich air-fuel ratio in the vicinity of the stoichiometric air-fuel ratio in order to suppress an increase in the amount of consumed fuel.

Here, when the air-fuel ratio of the exhaust gas flowing into the first catalyst casing 4 is a comparatively high air-fuel ratio in the vicinity of the stoichiometric air-fuel ratio (an air-fuel ratio between A/F2 and the stoichiometric air-fuel ratio in FIG. 5, for example), the hydrogen concentration is low, and therefore varies greatly in response to even slight variation in the air-fuel ratio. For this reason, the air-fuel ratio of the exhaust gas is preferably set to be lower during execution of the induction processing than during execution of the rich spike processing.

When the air-fuel ratio of the exhaust gas flowing into the first catalyst casing 4 is reduced greatly (reduced below A/F1 in FIG. 5, for example), however, the hydrogen concentration increases, but varies greatly in response to even slight variation in the air-fuel ratio.

Hence, during the induction processing according to this embodiment, the air-fuel ratio of the exhaust gas is adjusted so as to remain within a range (a range of A/F1 to A/F2 in FIG. 5) where the hydrogen concentration is comparatively large but variation in the hydrogen concentration relative to variation in the air-fuel ratio is small.

When the air-fuel ratio of the exhaust gas during the induction processing is adjusted in this manner, the amount of hydrogen supplied to the second catalyst casing 5 can be increased in comparison with the amount of hydrogen supplied during the rich spike processing. Moreover, the amount of hydrogen supplied to the second catalyst casing 5 does not vary greatly even when variation occurs in the air-fuel ratio of the exhaust gas during the induction processing. As a result, the deterioration diagnosis can be performed with a high degree of precision.

Procedures for executing the deterioration diagnosis according to this embodiment will be described below with reference to FIG. 6. FIG. 6 is a flowchart showing a processing routine executed by the ECU 6 to diagnose deterioration of the SCR catalyst in the second catalyst casing 5. A processing routine shown in FIG. 6 is stored in the ROM of the ECU 6 in advance, and executed by the ECU 6 repeatedly when the operating condition of the internal combustion engine 1 is in the lean operation region.

In the processing routine of FIG. 6, first, during processing of S101, the ECU 6 determines whether or not diagnosis conditions are established. Here, the diagnosis conditions are established when the operating condition of the internal combustion engine 1 is in the lean operation region, the NSR catalyst in the first catalyst casing 4 and the SCR catalyst in the second catalyst casing 5 are active, the first air-fuel ratio sensor 7 and second air-fuel ratio sensor 8 are normal, and so on.

When a negative determination is made in the processing of S101, the ECU 6 terminates the current processing routine. When an affirmative determination is made in the processing of S101, on the other hand, the ECU 6 advances to processing of S102. In the processing of S102, the ECU 6 determines whether or not a temperature Tmpscr of the SCR catalyst in the second catalyst casing 5 falls within the predetermined temperature range Rtemp. More specifically, the ECU 6 determines whether or not the temperature Tmpscr of the SCR catalyst is equal to or higher than temp2 and equal to or lower than temp3 in FIG. 4. At this time, the ECU 6 may either estimate the temperature Tmpscr of the SCR catalyst from an operating history of the internal combustion engine 1, or use a measurement value of the exhaust gas temperature sensor 9 as the temperature Tmpscr of the SCR catalyst.

When a negative determination is made in the processing of S102, the ECU 6 terminates the current processing routine. When an affirmative determination is made in the processing of S102, on the other hand, the ECU 6 advances to processing of S103, in which the ECU 6 executes the induction processing. More specifically, the ECU 6 reduces the air-fuel ratio of the exhaust gas flowing into the first catalyst casing 4 to a rich air-fuel ratio using a similar method to that of the rich spike processing described above. Note, however, that at this time, as described above with reference to FIG. 5, the air-fuel ratio of the exhaust gas flowing into the first catalyst casing 4 is adjusted so as to remain within a range (the range of A/F1 to A/F2 in FIG. 5) where the air-fuel ratio is smaller than the air-fuel ratio during the rich spike processing and variation in the hydrogen generation amount relative to variation in the air-fuel ratio is small. By having the ECU 6 execute the processing of S103 in this manner, "control means" according to the present invention is realized.

After executing the processing of S103, the ECU 6 advances to processing of S104, in which the ECU 6 reads a measurement value Raf1 of the first air-fuel ratio sensor 7 and a measurement value Raf2 of the second air-fuel ratio sensor 8. The ECU 6 then advances to processing of S105, in which the ECU 6 calculates the difference Da/f between the two measurement values read in S104 by subtracting the measurement value Raf1 of the first air-fuel ratio sensor 7 from the measurement value Raf2 of the second air-fuel ratio sensor 8.

In processing of S106, the ECU 6 calculates a sensor output difference sumDa/f over a period extending from the start of the induction processing to a current time. More specifically, the ECU 6 calculates the sensor output difference sumDa/f over the period extending from the start of the induction processing to the current time by adding the difference Da/f calculated during the processing of S105 to an integrated value sumDa/fold of the difference Da/f over a period extending from the start of the induction processing to a previous execution of S106.

In processing of S107, the ECU 6 determines whether or not a predetermined period has elapsed following the start of the induction processing. Here, the predetermined period is a period determined such that the difference between the sensor output difference obtained when the SCR catalyst has deteriorated and the sensor output difference obtained when the SCR catalyst has not deteriorated is sufficiently larger than the difference caused by the measurement error in the first air-fuel ratio sensor 7 and the second air-fuel ratio sensor 8. At this time, a period required for the amount of hydrogen generated by the NSR catalyst in the first catalyst casing 4 to reach a predetermined amount may be used as the predetermined period. In this case, the predetermined amount is set at an amount at which the difference between the sensor output difference obtained when the SCR catalyst has deteriorated and the sensor output difference obtained when the SCR catalyst has not deteriorated is believed to be sufficiently larger than the difference caused by the measurement error in the first air-fuel ratio sensor 7 and the second air-fuel ratio sensor 8. It is assumed that the predetermined period is determined in advance by adaptation processing using experiments and the like.

When a negative determination is made in the processing of S107, the ECU 6 returns to the processing of S103. When an affirmative determination is made in the processing of S107, on the other hand, the ECU 6 advances to processing of S108. In the processing of S108, the ECU 6 terminates the induction processing. In other words, the ECU 6 returns the air-fuel ratio of the exhaust gas flowing into the first catalyst casing 4 from a rich air-fuel ratio to a lean air-fuel ratio suited to the operating conditions of the internal combustion engine 1.

In processing of S109, the ECU 6 determines whether or not the sensor output difference sumDa/f calculated during the processing of S106 equals or exceeds a predetermined threshold T. The threshold T takes a value at which the $NO_X$ purification performance of the SCR catalyst can be considered to have deteriorated when the sensor output difference sumDa/f falls below the threshold T, this value being determined in advance by adaptation processing using experiments and the like.

When an affirmative determination (sumDa/f is not less than T) is made in the processing of S109, the ECU 6 advances to processing of S110, in which the ECU 6 determines that the SCR catalyst in the second catalyst casing 5 has not deteriorated (i.e. is normal). When a negative determination (sumDa/f is less than T) is made in the processing of S109, on the other hand, the ECU 6 advances to processing of S111, in which the ECU 6 determines that the SCR catalyst in the second catalyst casing 5 has deteriorated. In this case, the ECU 6 may prompt the driver to repair the second catalyst casing 5 using a warning lamp, a display apparatus, or the like provided in a cabin of the vehicle.

Note that by having the ECU 6 execute the processing of S103 to S111, "diagnosing means" according to the present invention is realized.

When the deterioration diagnosis is performed in accordance with the procedures described above, the sensor output difference sumDa/f includes both the difference caused by the oxygen released from the SCR catalyst and the difference caused by the hydrogen generated by the NSR catalyst, and therefore the effect of an error included in the measurement value of the first air-fuel ratio sensor 7 or the measurement value of the second air-fuel ratio sensor 8 can be reduced, enabling a highly precise deterioration diagnosis. Moreover, deterioration of the SCR catalyst can be diagnosed without relying on an expensive sensor such as a $NO_X$ sensor or an $NH_3$ sensor.

Note that in the processing routine shown in FIG. 6, deterioration of the SCR catalyst housed in the second catalyst casing 5 is diagnosed on the basis of the integrated value of the difference between the measurement value of the first air-fuel ratio sensor 7 and the measurement value of the second air-fuel ratio sensor 8 when the induction processing is executed. However, deterioration of the SCR catalyst in the second catalyst casing 5 may be diagnosed on the basis of an integrated value of the value (Aox) determined by inserting the difference between the measurement value of the first air-fuel ratio sensor 7 and the measurement value of the second air-fuel ratio sensor 8 into Equation (1).

Further, in this embodiment, an example in which the NSR catalyst is housed in the first catalyst casing 4 was described, but deterioration of the SCR catalyst can be diagnosed using similar procedures when a three-way catalyst is housed in the first catalyst casing 4. Basically, as long as a catalyst that promotes a water-gas shift reaction when the air-fuel ratio of the exhaust gas is enriched is disposed in the exhaust pipe 3 upstream of the first air-fuel ratio sensor 7, deterioration of the SCR catalyst can be diagnosed using the procedures described in this embodiment.

Furthermore, deterioration of the SCR catalyst can be diagnosed using similar procedures in a configuration where a catalyst casing housing a three-way catalyst is disposed upstream of the first catalyst casing 4. In a configuration where a catalyst casing housing a three-way catalyst is disposed upstream of the first catalyst casing 4, hydrogen is generated by the three-way catalyst in the catalyst casing disposed upstream of the first catalyst casing 4 as well as by the NSR catalyst in the first catalyst casing 4 during the induction processing, and therefore the difference between the integrated value sumDa/f obtained when the SCR catalyst in the second catalyst casing 5 has deteriorated and the integrated value sumDa/f obtained when the SCR catalyst has not deteriorated widens further. As a result, the deterioration diagnosis can be performed with an even higher degree of precision.

Embodiment 2

Next, a second embodiment of the present invention will be described on the basis of FIGS. 7 and 8. Here, configurations that differ from the first embodiment will be described, while description of identical configurations will be omitted.

In the first embodiment, described above, an example in which deterioration of the SCR catalyst in the second catalyst casing 5 is diagnosed when the NSR catalyst in the first catalyst casing 4 has not deteriorated was described, whereas in this embodiment, an example in which deterioration of the SCR catalyst in the second catalyst casing 5 is diagnosed when the NSR catalyst in the first catalyst casing 4 has deteriorated will be described.

When the NSR catalyst housed in the first catalyst casing 4 deteriorates, a water-gas shift reaction is less likely to be activated, and as a result, the amount of hydrogen generated by the NSR catalyst during the induction processing decreases. Hence, following deterioration of the NSR catalyst in the first catalyst casing 4, the difference between the measurement value of the first air-fuel ratio sensor 7 and the measurement value of the second air-fuel ratio sensor 8 decreases even when the SCR catalyst in the second catalyst casing 5 has not deteriorated. As a result, the sensor output difference sumDa/f described in the first embodiment may fall below the threshold T such that deterioration of the SCR catalyst in the second catalyst casing 5 is misdiagnosed even though the SCR catalyst has not deteriorated.

In this embodiment, on the other hand, when the NSR catalyst in the first catalyst casing 4 deteriorates, the sensor output difference sumDa/f is corrected, whereupon the deterioration diagnosis is performed on the basis of the corrected sensor output difference sumDa/f.

FIG. 7 is a view showing a relationship between a degree of deterioration of the NSR catalyst in the first catalyst casing 4 and the amount of hydrogen (the hydrogen generation amount) generated by the NSR catalyst during the execution period of the induction processing. In FIG. 7, the amount of hydrogen generated by the NSR catalyst in the first catalyst casing 4 during the execution period of the induction processing decreases as the degree of deterioration of the NSR catalyst increases.

Hence, in this embodiment, the sensor output difference sumDa/f is corrected so as to increase steadily as the degree of deterioration of the NSR catalyst in the first catalyst casing 4 increases. More specifically, first, the hydrogen generation amount corresponding to the degree of deterioration of the NSR catalyst is determined on the basis of a relationship such as that shown in FIG. 7. Next, the ECU 6 determines a difference between the hydrogen generation amount and the hydrogen generation amount obtained when the NSR catalyst has not deteriorated, and converts this difference into a difference between the measurement value of the first air-fuel ratio sensor 7 and the measurement value of the second air-fuel ratio sensor 8. It is assumed at this time that a relationship between the hydrogen generation amount difference and the sensor output difference is determined in advance by experiment and stored in the ROM of the ECU 6 in the form of a map or a function expression. Further, the ECU 6 adds the converted value to the sensor output difference sumDa/f determined from the measurement value of the first air-fuel ratio sensor 7 and the measurement value of the second air-fuel ratio sensor 8 during the induction processing.

The sensor output difference sumDa/f corrected by this method takes an identical value to the sensor output difference obtained when the NSR catalyst has not deteriorated. Hence, when deterioration of the SCR catalyst in the second catalyst casing 5 is diagnosed by comparing the corrected sensor output difference sumDa/f with the threshold T, deterioration of the SCR catalyst in the second catalyst casing 5 can be diagnosed with a high degree of precision even in a case where the NSR catalyst in the first catalyst casing 4 has deteriorated.

Procedures for executing a deterioration diagnosis according to this embodiment will be described below with reference to FIG. 8. FIG. 8 is a flowchart showing a processing routine executed by the ECU 6 to diagnose deterioration of the SCR catalyst in the second catalyst casing 5. Note that in FIG. 8, identical processes to the processing routine shown in FIG. 6 have been allocated identical reference signs.

In the processing routine of FIG. 8, the ECU 6 executes processing of S201 after executing the processing of S108. In the processing of S201, the ECU 6 determines whether or not the NSR catalyst in the first catalyst casing 4 is normal. At this time, the ECU 6 determines whether or not the NSR catalyst in the first catalyst casing 4 has deteriorated by referring to a result of a deterioration diagnosis implemented separately in relation to the NSR catalyst.

Here, a method based on the oxygen storage capacity of the NSR catalyst can be used as a method of diagnosing deterioration of the NSR catalyst. For example, an air-fuel ratio sensor is disposed in the exhaust pipe 3 upstream of the first catalyst casing 4, and an amount of oxygen released from the NSR catalyst immediately after the air-fuel ratio of the exhaust gas flowing into the first catalyst casing 4 is switched from a lean air-fuel ratio to a rich air-fuel ratio is determined using this air-fuel ratio sensor and the first air-fuel ratio sensor 7. When the oxygen amount equals or exceeds a predetermined threshold, the NSR catalyst may be determined to be normal, and when the oxygen amount is smaller than the predetermined threshold, the NSR catalyst may be determined to have deteriorated. Note that the method of diagnosing deterioration of the NSR catalyst is not limited to this method, and instead, for example, deterioration may be diagnosed on the basis of an amount of $NO_X$ that can be occluded to the NSR catalyst (a $NO_X$ storage capacity).

When an affirmative determination is made in the processing of S201, the ECU 6 advances to the processing of S109, in which, similarly to the first embodiment, the ECU 6 performs a deterioration diagnosis using the sensor output difference sumDa/f calculated during the processing of S106.

When a negative determination is made in the processing of S201, on the other hand, the ECU 6 advances to processing of S202, in which the ECU 6 corrects the sensor output difference sumDa/f calculated during the processing of S106. More specifically, first, the ECU 6 determines the degree of deterioration of the NSR catalyst using the oxygen storage capacity or the $NO_X$ storage capacity of the NSR catalyst as a parameter. At this time, the ECU 6 determines the degree of deterioration of the NSR catalyst to be steadily higher as the oxygen storage capacity or the $NO_X$ storage capacity, determined during the processing for diagnosing deterioration of the NSR catalyst, decreases. The ECU 6 then determines the hydrogen generation amount corresponding to the degree of deterioration of the NSR catalyst on the basis of the determined degree of deterioration and a relationship such as that shown in FIG. 7. Next, the ECU 6 determines a difference between the hydrogen generation amount and the hydrogen generation amount obtained when the NSR catalyst has not deteriorated, and converts the difference into a difference Caf between the measurement value of the first air-fuel ratio sensor 7 and the measurement value of the second air-fuel ratio sensor 8. The ECU 6 then adds the difference Caf to the sensor output difference sumDa/f calculated during the processing of S106. By having the ECU 6 execute the processing of S202 in this manner, "correcting means" according to the present invention is realized.

Once the sensor output difference sumDa/f has been corrected, the ECU 6 performs a deterioration diagnosis in the processing of S109 using the sensor output difference sumDa/f corrected during the processing of S202. In other words, the ECU 6 determines whether or not the sensor output difference sumDa/f corrected during the processing of S202 equals or exceeds the threshold T.

When the deterioration diagnosis is performed using the procedures described above, the deterioration diagnosis can be performed with a high degree of precision using the measurement value of the first air-fuel ratio sensor 7 and the measurement value of the second air-fuel ratio sensor 8 even in a case where the NSR catalyst in the first catalyst casing 4 has deteriorated.

Note that in this embodiment, an example in which the NSR catalyst is housed in the first catalyst casing 4 was described, but deterioration of the SCR catalyst can be diagnosed using similar procedures when a three-way catalyst is housed in the first catalyst casing 4. Further, in a configuration where a catalyst casing housing a three-way catalyst is disposed upstream of the first catalyst casing 4, the sensor output difference sumDa/f may be corrected in accordance with the degree of deterioration of the NSR catalyst and a degree of deterioration of the three-way catalyst, whereupon deterioration of the SCR catalyst can be diagnosed using the corrected sensor output difference sumDa/f.

Incidentally, in this embodiment, an example in which the sensor output difference sumDa/f is corrected in accordance with the degree of deterioration of the NSR catalyst housed in the first catalyst casing 4 was described, but instead of correcting the sensor output difference sumDa/f, the threshold T may be corrected. In this case, similar effects to those of a case in which the sensor output difference is corrected can be obtained by correcting the threshold T to a steadily smaller value as the degree of deterioration of the NSR catalyst increases.

Embodiment 3

Next, a third embodiment of the present invention will be described on the basis of FIGS. 9 to 12. Here, configurations that differ from the first embodiment will be described, while description of identical configurations will be omitted.

In the first embodiment, described above, an example in which the deterioration diagnosis is performed on the basis of the difference (the sensor output difference sumDa/f) between the measurement value of the first air-fuel ratio sensor 7 and the measurement value of the second air-fuel ratio sensor 8 during the execution period of the induction processing was described. In this embodiment, on the other hand, an example in which an integrated value of a difference between the measurement value of the first air-fuel ratio sensor 7 and the measurement value of the second air-fuel ratio sensor 8 following termination of the induction processing is added to the integrated value of the difference between the measurement value of the first air-fuel ratio sensor 7 and the measurement value of the second air-fuel ratio sensor 8 during the execution period of the induction processing, and deterioration of the SCR catalyst is diagnosed on the basis of the calculation result, will be described.

When the air-fuel ratio of the exhaust gas flowing into the first catalyst casing 4 is modified from a rich air-fuel ratio to a lean air-fuel ratio upon termination of the induction processing, the oxygen in the exhaust gas is occluded to the SCR catalyst in the second catalyst casing 5, and as a result, a difference is generated between the measurement value of the first air-fuel ratio sensor 7 and the measurement value of the second air-fuel ratio sensor 8. By integrating the difference between the measurement value of the first air-fuel ratio sensor 7 and the measurement value of the second air-fuel ratio sensor 8 over the period in which the difference is generated, the amount of oxygen occluded to the SCR catalyst can be specified.

However, the amount of oxygen that can be occluded to the SCR catalyst in the second catalyst casing 5 over this period decreases steadily as the amount of ammonia adsorbed to the SCR catalyst upon termination of the induction processing increases. Further, the amount of ammonia adsorbed to the SCR catalyst upon termination of the induction processing varies according to the deterioration condition of the NSR catalyst housed in the first catalyst casing 4.

When the induction processing is executed such that the air-fuel ratio of the exhaust gas is modified from a lean air-fuel ratio to a rich air-fuel ratio, a part of the $NO_X$ released from the NSR catalyst in the first catalyst casing 4 is converted into ammonia. The ammonia generated in this manner is adsorbed to the SCR catalyst in the second catalyst casing 5. However, the amount of ammonia generated in the first catalyst casing 4 decreases steadily as the degree of deterioration of the NSR catalyst increases.

Therefore, the amount of ammonia adsorbed to the SCR catalyst in the second catalyst casing 5 at a termination point of the induction processing decreases steadily as the degree of deterioration of the NSR catalyst in the first catalyst casing 4 increases. Accordingly, the amount of oxygen occluded to the SCR catalyst following termination of the induction processing increases steadily as the degree of deterioration of the NSR catalyst in the first catalyst casing 4 increases. As a result, the integrated value of the difference between the measurement value of the first air-fuel ratio sensor 7 and the measurement value of the second air-fuel ratio sensor 8 following execution of the induction processing increases steadily as the degree of deterioration of the NSR catalyst in the first catalyst casing 4 increases.

On the other hand, as described above in the second embodiment, the integrated value of the difference between the measurement value of the first air-fuel ratio sensor 7 and the measurement value of the second air-fuel ratio sensor 8 during the execution period of the induction processing decreases steadily as the degree of deterioration of the NSR catalyst in the first catalyst casing 4 increases.

Hence, when the integrated value (a second sensor output difference) of the difference between the measurement value of the first air-fuel ratio sensor 7 and the measurement value of the second air-fuel ratio sensor 8 following execution of the induction processing is added to the integrated value (a first sensor output difference) of the difference between the measurement value of the first air-fuel ratio sensor 7 and the measurement value of the second air-fuel ratio sensor 8 during the execution period of the induction processing, a reduction in the first sensor output difference caused by a reduction in the hydrogen generation amount is compensated for by an increase in the second sensor output difference caused by a reduction in the ammonia generation amount.

Here, FIGS. 9 and 10 show relationships between the degree of deterioration of the NSR catalyst housed in the first catalyst casing 4 and the respective sensor output differences. As shown in FIG. 9, the first sensor output difference decreases steadily as the degree of deterioration of the NSR catalyst increases. As shown in FIG. 10, on the other hand, the second sensor output difference increases steadily as the degree of deterioration of the NSR catalyst increases. As a result, as shown in FIG. 11, a sum (referred to hereafter as a "total sensor output difference") of the first sensor output difference and the second sensor output difference takes a substantially fixed value regardless of the degree of deterioration of the NSR catalyst.

Hence, by diagnosing deterioration of the SCR catalyst housed in the second catalyst casing 5 using the total sensor output difference as a parameter, the deterioration diagnosis can be performed with a high degree of precision even without taking the degree of deterioration of the NSR catalyst housed in the first catalyst casing 4 into account.

Note that after the air-fuel ratio of the exhaust gas is switched from a rich air-fuel ratio to a lean air-fuel ratio upon termination of the induction processing, substantially no hydrogen is generated in the first catalyst casing 4, and therefore the difference between the measurement value of the first air-fuel ratio sensor 7 and the measurement value of the second air-fuel ratio sensor 8 is likely to decrease even when the SCR catalyst in the second catalyst casing 5 has not deteriorated. Further, when the air-fuel ratio of the exhaust gas varies rapidly, the measurement value of the first air-fuel ratio sensor 7 and the measurement value of the second air-fuel ratio sensor 8 may deviate from the actual air-fuel ratio. Hence, when the air-fuel ratio of the exhaust gas is switched from a rich air-fuel ratio to a lean air-fuel ratio suited to the operating condition of the internal combustion engine 1 in a single step upon termination of the induction processing, the difference corresponding to the oxygen storage performance of the SCR catalyst may not appear between the measurement value of the first air-fuel ratio sensor 7 and the measurement value of the second air-fuel ratio sensor 8.

Upon termination of the induction processing according to this embodiment, therefore, the air-fuel ratio of the exhaust gas is switched to a weak lean air-fuel ratio that is lower than the lean air-fuel ratio suited to the operating condition of the internal combustion engine 1, and then switched from the weak lean air-fuel ratio to the lean air-fuel ratio suited to the operating condition of the internal combustion engine 1. Here, the weak lean air-fuel ratio is an air-fuel ratio that reflects the difference corresponding to the oxygen storage performance of the SCR catalyst between the measurement value of the first air-fuel ratio sensor 7 and the measurement value of the second air-fuel ratio sensor 8, and is assumed to be determined in advance by adaptation processing using experiments and the like. Further, a period (referred to hereafter as a "holding period") in which the air-fuel ratio of the exhaust gas is held at the weak lean air-fuel ratio is set to be equal to a time required for the oxygen storage performance of the SCR catalyst in a normal condition to be saturated at the weak lean air-fuel ratio, or by adding a margin to this time.

Procedures for executing a deterioration diagnosis according to this embodiment will be described below with reference to FIG. 12. FIG. 12 is a flowchart showing a processing routine executed by the ECU 6 to diagnose deterioration of the SCR catalyst in the second catalyst casing 5. Note that in FIG. 12, identical processes to the processing routine shown in FIG. 6 have been allocated identical reference signs.

In the processing routine of FIG. 12, the ECU 6 advances to processing of S301 after executing the processing of S104. In S301, the ECU 6 calculates a difference Da/f1 between the two measurement values read in S104 by subtracting the measurement value Raf1 of the first air-fuel ratio sensor 7 from the measurement value Raf2 of the second air-fuel ratio sensor 8.

After executing the processing of S301, the ECU 6 advances to processing of S302, in which the ECU 6 calculates a first sensor output difference sumDa/f1 serving as a sum of the difference Da/f1 over the period extending from the start of the induction processing to the current time. The first sensor output difference sumDa/f1 is calculated using a similar method to that of the processing of S106 in FIG. 6.

Further, when an affirmative determination is made in the processing of S107, the ECU 6 executes processing of S303 to S309 in sequence. First, in processing of S303, the ECU 6 terminates the induction processing and modifies the air-fuel ratio of the exhaust gas flowing into the first catalyst casing 4 from a rich air-fuel ratio to the weak lean air-fuel ratio.

In processing of S304, the ECU 6 reads the measurement value Raf1 of the first air-fuel ratio sensor 7 and the measurement value Raf2 of the second air-fuel ratio sensor 8. The ECU 6 then advances to processing of S305, in which the ECU 6 calculates a difference Da/f2 between the two measurement values read in S304 by subtracting the measurement value Raf2 of the second air-fuel ratio sensor 8 from the measurement value Raf1 of the first air-fuel ratio sensor 7.

In processing of S306, the ECU 6 calculates a second sensor output difference sumDa/f2 serving as a sum of the difference Da/f2 over a period extending from termination of the induction processing (a point at which the air-fuel ratio of the exhaust gas is switched to the weak lean air-fuel ratio) to the current time. More specifically, the ECU 6 calculates the sum (the second sensor output difference sumDa/f2) of the difference Da/f2 over the period extending from termination of the induction processing to the current time by adding the difference Da/f2 calculated in the processing of S305 to an integrated value sumDa/fold2 of the difference Da/f2 over a period extending from termination of the induction processing to a previous execution of S306.

In processing of S307, the ECU 6 determines whether or not an elapsed time up to the current time following termination of the induction processing equals or exceeds the holding period. When a negative determination is made in the processing of S307, the ECU 6 returns to the processing of S303. When an affirmative determination is made in the processing of S307, the ECU 6 advances to processing of S308.

In the processing of S308, the ECU 6 returns the air-fuel ratio of the exhaust gas flowing into the first catalyst casing 4 from the weak lean air-fuel ratio to the lean air-fuel ratio (a normal air-fuel ratio) suited to the operating condition of the internal combustion engine 1.

In processing of S309, the ECU 6 calculates a total sensor output difference sumDa/ftotal of the first sensor output difference sumDa/f1 calculated in the processing of S106 and the second sensor output difference sumDa/f2 calculated in the processing of S306, and determines whether or not the total sensor output difference sumDa/ftotal equals or exceeds a predetermined threshold Tt. Here, the threshold Tt takes a value at which the $NO_X$ purification performance of the SCR catalyst can be determined to have deteriorated when the total sensor output difference sumDa/ftotal falls below the threshold Tt, this value being determined in advance by adaptation processing using experiments and the like.

When an affirmative determination (sumDa/ftotal is not less than Tt) is made in the processing of S309, the ECU 6 advances to processing of S110, in which the ECU 6 determines that the SCR catalyst in the second catalyst casing 5 has not deteriorated (i.e. is normal). When a negative determination (sumDa/ftotal is less than Tt) is made in the processing of S309, on the other hand, the ECU 6 advances to the processing of S111, in which the ECU 6 determines that the SCR catalyst in the second catalyst casing 5 has deteriorated.

When deterioration of the SCR catalyst in the second catalyst casing 5 is diagnosed using the procedures described above, the deterioration diagnosis can be performed with a high degree of precision without taking the deterioration condition of the NSR catalyst housed in the first catalyst casing 4 into account.

Note that this embodiment may be configured such that the deterioration diagnosis method using the total sensor output difference is executed only when the NSR catalyst in the first catalyst casing 4 has deteriorated. In other words, when the NSR catalyst in the first catalyst casing 4 has not deteriorated, the deterioration diagnosis may be performed using the first sensor output difference, as described in the first embodiment. According to this method, a time required for the deterioration diagnosis can be shortened in a case where the NSR catalyst in the first catalyst casing 4 has not deteriorated, and as a result, an increase in the amount of fuel consumed during the deterioration diagnosis can be minimized.

REFERENCE SIGNS LIST 1 internal combustion engine
2 fuel injection valve
3 exhaust pipe
4 first catalyst casing
5 second catalyst casing
7 first air-fuel ratio sensor
8 second air-fuel ratio sensor
9 exhaust gas temperature sensor

The invention claimed is:

1. A deterioration diagnosis apparatus for use in an exhaust gas purification apparatus which comprises:
a first exhaust gas purification apparatus that is provided in an exhaust passage of an internal combustion engine capable of performing a lean burn operation, and that is configured to include a catalyst that promotes a water-gas shift reaction when an air-fuel ratio of exhaust gas is a rich air-fuel ratio that is lower than a stoichiometric air-fuel ratio; and
a second exhaust gas purification apparatus that is disposed in the exhaust passage downstream of the first exhaust gas purification apparatus, and that is configured to include a selective catalytic reduction catalyst that occludes oxygen contained in the exhaust gas when the air-fuel ratio of the exhaust gas is a lean air-fuel ratio that is higher than the stoichiometric air-fuel ratio, and releases the occluded oxygen when the air-fuel ratio of the exhaust gas is equal to or lower than the stoichiometric air-fuel ratio,
the deterioration diagnosis apparatus comprising:
a first sensor configured to measure a physical quantity that correlates with an oxygen concentration of exhaust gas flowing into the second exhaust gas purification apparatus;
a second sensor configured to measure a physical quantity that correlates with an oxygen concentration of exhaust gas flowing out of the second exhaust gas purification apparatus; and
a controller configured to diagnose deterioration of the second exhaust gas purification apparatus,
wherein the controller is configured to:
execute induction processing, which is processing for inducing the water-gas shift reaction in the first exhaust gas purification apparatus, by modifying an air-fuel ratio of exhaust gas flowing into the first exhaust gas purification apparatus to a rich air-fuel ratio that is lower than the stoichiometric air-fuel ratio when an air-fuel ratio of exhaust gas discharged from the internal combustion engine is a lean air-fuel ratio; and
diagnose deterioration of the second exhaust gas purification apparatus using, as a parameter, a difference that appears between a measurement value of the first sensor and a measurement value of the second sensor when the induction processing is executed.

2. The deterioration diagnosis apparatus for use an exhaust gas purification apparatus according to claim 1, wherein
the controller executes the induction processing when a temperature of the second exhaust gas purification apparatus falls within a temperature range in which hydrogen contained in the exhaust gas can be oxidized by the selective catalytic reduction catalyst in the second exhaust gas purification apparatus, an amount by which a hydrogen oxidation amount varies within the temperature range being equal to or smaller than a predetermined amount.

3. The deterioration diagnosis apparatus for use an exhaust gas purification apparatus according to claim 2, wherein
the catalyst included in the first exhaust gas purification apparatus is a $NO_x$ storage reduction catalyst that is configured to occlude nitrogen oxide contained in the exhaust gas when the air-fuel ratio of the exhaust gas is a lean air-fuel ratio, and to reduce the nitrogen oxide while releasing the nitrogen oxide when the air-fuel ratio of the exhaust gas is a rich air-fuel ratio, and
the controller makes the air-fuel ratio of the exhaust gas flowing into the first exhaust gas purification apparatus during execution of the induction processing lower than the air-fuel ratio of the exhaust gas flowing into the first exhaust gas purification apparatus during execution of rich spike processing, which is processing for regenerating a $NO_x$ storage ability of the $NO_x$ storage reduction catalyst.

4. The deterioration diagnosis apparatus for use an exhaust gas purification apparatus according to claim 3, wherein
the controller is configured to correct the difference appearing between the measurement value of the first sensor and the measurement value of the second sensor upon execution of the induction processing when the catalyst in the first exhaust gas purification apparatus has deteriorated, and correct the difference so as to increase steadily as a degree of deterioration of the catalyst in the first exhaust gas purification apparatus increases, and
the controller diagnoses deterioration of the second exhaust gas purification apparatus using a corrected value as a parameter.

5. The deterioration diagnosis apparatus for use an exhaust gas purification apparatus according to claim 3, wherein
the controller diagnoses deterioration of the second exhaust gas purification apparatus using, as a parameter, a sum of a difference between the measurement value of the first sensor and the measurement value of the second sensor obtained when the air-fuel ratio of the exhaust gas flowing into the first exhaust gas purification apparatus is modified from a lean air-fuel ratio to a rich air-fuel ratio in response to execution of the induction processing, and a difference between the measurement value of the first sensor and the measurement value of the second sensor obtained when the air-fuel ratio of the exhaust gas flowing into the first exhaust gas purification apparatus is modified from a rich air-fuel ratio to a lean air-fuel ratio upon termination of the induction processing.

6. The deterioration diagnosis apparatus for use an exhaust gas purification apparatus according to claim 2, wherein
the controller is configured to correct the difference appearing between the measurement value of the first sensor and the measurement value of the second sensor upon execution of the induction processing when the catalyst in the first exhaust gas purification apparatus has deteriorated, and correct the difference so as to increase steadily as a degree of deterioration of the catalyst in the first exhaust gas purification apparatus increases, and
the controller diagnoses deterioration of the second exhaust gas purification apparatus using a corrected value as a parameter.

7. The deterioration diagnosis apparatus for use an exhaust gas purification apparatus according to claim 1, wherein
the catalyst included in the first exhaust gas purification apparatus is a $NO_x$ storage reduction catalyst that is configured to occlude nitrogen oxide contained in the exhaust gas when the air-fuel ratio of the exhaust gas is a lean air-fuel ratio, and to reduce the nitrogen oxide while releasing the nitrogen oxide when the air-fuel ratio of the exhaust gas is a rich air-fuel ratio, and
the controller makes the air-fuel ratio of the exhaust gas flowing into the first exhaust gas purification apparatus during execution of the induction processing lower than the air-fuel ratio of the exhaust gas flowing into the first exhaust gas purification apparatus during execution of rich spike processing, which is processing for regenerating a $NO_x$ storage ability of the $NO_x$ storage reduction catalyst.

8. The deterioration diagnosis apparatus for use an exhaust gas purification apparatus according to claim 7, wherein
the controller diagnoses deterioration of the second exhaust gas purification apparatus using, as a parameter, a sum of a difference between the measurement value of the first sensor and the measurement value of the second sensor obtained when the air-fuel ratio of the exhaust gas flowing into the first exhaust gas purification apparatus is modified from a lean air-fuel ratio to a rich air-fuel ratio in response to execution of the induction processing, and a difference between the measurement value of the first sensor and the measurement value of the second sensor obtained when the air-fuel ratio of the exhaust gas flowing into the first exhaust gas purification apparatus is modified from a rich air-fuel ratio to a lean air-fuel ratio upon termination of the induction processing.

9. The deterioration diagnosis apparatus for use an exhaust gas purification apparatus according to claim 7, wherein
the controller is configured to correct the difference appearing between the measurement value of the first sensor and the measurement value of the second sensor upon execution of the induction processing when the catalyst in the first exhaust gas purification apparatus has deteriorated, and correct the difference so as to increase steadily as a degree of deterioration of the catalyst in the first exhaust gas purification apparatus increases, and
the controller diagnoses deterioration of the second exhaust gas purification apparatus using a corrected value as a parameter.

10. The deterioration diagnosis apparatus for use an exhaust gas purification apparatus according to claim 1, wherein
the controller is configured to correct the difference appearing between the measurement value of the first sensor and the measurement value of the second sensor upon execution of the induction processing when the catalyst in the first exhaust gas purification apparatus has deteriorated, and correct the difference so as to increase steadily as a degree of deterioration of the catalyst in the first exhaust gas purification apparatus increases, and
the controller diagnoses deterioration of the second exhaust gas purification apparatus using a corrected value as a parameter.

* * * * *